US010290182B2

(12) United States Patent
Arnone et al.

(10) Patent No.: US 10,290,182 B2
(45) Date of Patent: May 14, 2019

(54) DRAW CERTIFICATE BASED HYBRID GAME

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 15/449,256

(22) Filed: Mar. 3, 2017

(65) Prior Publication Data

US 2017/0178449 A1 Jun. 22, 2017

Related U.S. Application Data

(63) Continuation of application No. 14/255,253, filed on Apr. 17, 2014, now abandoned, which is a
(Continued)

(51) Int. Cl.
*A63F 9/24* (2006.01)
*A63F 13/00* (2014.01)
*G07F 17/32* (2006.01)

(52) U.S. Cl.
CPC ........ *G07F 17/3241* (2013.01); *G07F 17/326* (2013.01); *G07F 17/3223* (2013.01);
(Continued)

(58) Field of Classification Search
CPC ............. G07F 17/3223; G07F 17/3225; G07F 17/3241; G07F 17/3267; G07F 17/3244; G07F 17/3262; G07F 17/34
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 2001300098 A 10/2001
JP 2003111980 A 4/2003
(Continued)

OTHER PUBLICATIONS

U.S. Appl. No. 15/063,365 Arnone, et al. filed Mar. 7, 2016.
(Continued)

*Primary Examiner* — Lawrence S Galka
(74) *Attorney, Agent, or Firm* — Caitlyn Ross; Frank Cire

(57) ABSTRACT

A draw certificate hybrid game system that uses encrypted draw certificates issued by a draw server to resolve wagers in a gambling game. The draw certificate hybrid game system uses a computing device to provide a entertainment game of skill. Player actions are received by the computing device and used to determine a wager in a wagering event game. This wager is associated with an encrypted draw certificate. In response to the indicated wager, the computing device requests an authentication result, determined by the draw server decrypting an encrypted draw certificate. The computing device then determines a wager result from the authentication result, provides the wager result to the player within the entertainment game, and determines a change the entertainment game based on the wager result.

5 Claims, 26 Drawing Sheets

Related U.S. Application Data continuation of application No. PCT/US2013/038045, filed on Apr. 24, 2013.

(60) Provisional application No. 61/638,063, filed on Apr. 25, 2012.

(52) U.S. Cl.
CPC ...... *G07F 17/3225* (2013.01); *G07F 17/3227* (2013.01); *G07F 17/3244* (2013.01); *G07F 17/3262* (2013.01); *G07F 17/3267* (2013.01); *G07F 17/3295* (2013.01)

(56) References Cited

U.S. PATENT DOCUMENTS 5,785,592 A 7/1998 Jacobsen
5,853,324 A 12/1998 Kami et al.
5,963,745 A 10/1999 Collins et al.
6,050,895 A 4/2000 Luciano
6,165,071 A 12/2000 Weiss
6,227,974 B1 5/2001 Eilat
6,267,669 B1 7/2001 Luciano
6,419,583 B1 * 7/2002 Crumby .................. G07F 17/32 273/138.1
6,685,563 B1 2/2004 Meekins et al.
6,712,693 B1 3/2004 Hettinger
6,761,632 B2 7/2004 Bansemer et al.
6,761,633 B2 7/2004 Riendeau
6,764,397 B1 7/2004 Robb
6,811,482 B2 11/2004 Letovsky
7,118,105 B2 10/2006 Benevento
7,294,058 B1 11/2007 Slomiany
7,326,115 B2 2/2008 Baerlocher
7,361,091 B2 4/2008 Letovsky
7,517,282 B1 4/2009 Pryor
7,575,517 B2 8/2009 Parham et al.
7,682,239 B2 3/2010 Friedman et al.
7,720,733 B2 5/2010 Jung
7,753,770 B2 7/2010 Walker et al.
7,753,790 B2 7/2010 Nguyen
7,766,742 B2 8/2010 Bennett et al.
7,775,885 B2 8/2010 Van Luchene
7,798,896 B2 9/2010 Katz
7,828,657 B2 11/2010 Booth
7,917,371 B2 3/2011 Jung et al.
7,931,531 B2 4/2011 Oberberger
7,938,727 B1 5/2011 Konkle
7,950,993 B2 5/2011 Oberberger
7,967,674 B2 6/2011 Baerlocher
7,980,948 B2 7/2011 Rowe
7,996,264 B2 8/2011 Kusumoto et al.
8,012,023 B2 9/2011 Gates
8,047,908 B2 11/2011 Walker et al.
8,047,915 B2 11/2011 Lyle
8,060,829 B2 11/2011 Jung et al.
8,075,383 B2 12/2011 Friedman et al.
8,087,999 B2 1/2012 Oberberger
8,113,938 B2 2/2012 Friedman et al.
8,118,654 B1 2/2012 Nicolas
8,128,487 B2 3/2012 Hamilton et al.
8,135,648 B2 3/2012 Oram
8,137,193 B1 3/2012 Kelly et al.
8,142,272 B2 3/2012 Walker
8,157,653 B2 4/2012 Buhr
8,167,699 B2 5/2012 Inamura
8,177,628 B2 5/2012 Manning
8,182,338 B2 5/2012 Thomas
8,182,339 B2 5/2012 Anderson
8,187,068 B2 5/2012 Slomiany
8,206,210 B2 6/2012 Walker
8,308,544 B2 11/2012 Friedman
8,430,735 B2 4/2013 Oberberger
8,475,266 B2 7/2013 Arnone
8,480,470 B2 7/2013 Napolitano et al.
8,622,809 B1 1/2014 Arora et al.
8,864,564 B2 10/2014 Oberberger
9,070,257 B1 6/2015 Scalise
2001/0004609 A1 6/2001 Walker et al.
2001/0019965 A1 9/2001 Ochi
2001/0044337 A1 * 11/2001 Rowe ...................... A63F 13/12 463/29
2002/0022509 A1 2/2002 Nicastro
2002/0090990 A1 7/2002 Joshi et al.
2002/0175471 A1 11/2002 Faith
2003/0060286 A1 3/2003 Walker et al.
2003/0119576 A1 6/2003 McClintic et al.
2003/0139214 A1 7/2003 Wolf et al.
2003/0171149 A1 9/2003 Rothschild
2003/0204565 A1 10/2003 Guo et al.
2003/0211879 A1 11/2003 Englman
2004/0092313 A1 5/2004 Saito et al.
2004/0097610 A1 5/2004 Saito
2004/0102238 A1 5/2004 Taylor
2004/0121839 A1 6/2004 Webb
2004/0225387 A1 11/2004 Smith
2005/0003878 A1 1/2005 Updike
2005/0020354 A1 * 1/2005 Nguyen ................. G06Q 40/00 463/25
2005/0054438 A1 * 3/2005 Rothschild .............. G07F 17/32 463/29
2005/0096124 A1 5/2005 Stronach
2005/0116411 A1 6/2005 Herrmann et al.
2005/0192087 A1 9/2005 Friedman et al.
2005/0233791 A1 10/2005 Kane
2005/0233806 A1 10/2005 Kane et al.
2005/0239538 A1 10/2005 Dixon
2005/0269778 A1 12/2005 Samberg
2005/0288101 A1 12/2005 Lockton et al.
2006/0003823 A1 1/2006 Ihang
2006/0003830 A1 1/2006 Walker et al.
2006/0025209 A1 * 2/2006 Walker .................... G07F 17/32 463/25
2006/0035696 A1 2/2006 Walker
2006/0040735 A1 2/2006 Baerlocher
2006/0068913 A1 3/2006 Walker et al.
2006/0084499 A1 4/2006 Moshal
2006/0084505 A1 4/2006 Yoseloff
2006/0135250 A1 6/2006 Rossides
2006/0154710 A1 7/2006 Serafat
2006/0166729 A1 7/2006 Saffari et al.
2006/0189371 A1 8/2006 Walker et al.
2006/0223611 A1 10/2006 Baerlocher
2006/0234791 A1 10/2006 Nguyen et al.
2006/0240890 A1 10/2006 Walker
2006/0246403 A1 11/2006 Monpouet et al.
2006/0258433 A1 11/2006 Finocchio et al.
2007/0026924 A1 2/2007 Taylor
2007/0035548 A1 2/2007 Jung et al.
2007/0038559 A1 2/2007 Jung et al.
2007/0064074 A1 3/2007 Silverbrook et al.
2007/0087799 A1 4/2007 Van Luchene
2007/0093299 A1 4/2007 Bergeron
2007/0099696 A1 5/2007 Nguyen et al.
2007/0117641 A1 5/2007 Walker et al.
2007/0129149 A1 6/2007 Walker
2007/0142108 A1 6/2007 Linard
2007/0156509 A1 7/2007 Jung et al.
2007/0167212 A1 7/2007 Nguyen
2007/0167239 A1 7/2007 O'Rourke
2007/0173311 A1 7/2007 Morrow et al.
2007/0191104 A1 8/2007 Van Luchene
2007/0202941 A1 8/2007 Miltenberger
2007/0203828 A1 8/2007 Jung et al.
2007/0207847 A1 9/2007 Thomas
2007/0259717 A1 11/2007 Mattice
2007/0293306 A1 12/2007 Nee et al.
2008/0004107 A1 1/2008 Nguyen et al.
2008/0014835 A1 1/2008 Weston et al.
2008/0015004 A1 1/2008 Gatto et al.
2008/0064458 A1 3/2008 Yang
2008/0064488 A1 3/2008 Oh
2008/0070659 A1 3/2008 Naicker
2008/0070690 A1 3/2008 Van Luchene

(56) References Cited

U.S. PATENT DOCUMENTS

2008/0070702 A1 3/2008 Kaminkow
2008/0096665 A1 4/2008 Cohen
2008/0108406 A1 5/2008 Oberberger
2008/0108425 A1 5/2008 Oberberger
2008/0113704 A1 5/2008 Jackson
2008/0119283 A1 5/2008 Baerlocher
2008/0146308 A1 6/2008 Okada
2008/0161081 A1 7/2008 Berman
2008/0176619 A1 7/2008 Kelly
2008/0191418 A1 8/2008 Lutnick et al.
2008/0195481 A1 8/2008 Lutnick
2008/0248850 A1 10/2008 Schugar
2008/0254893 A1 10/2008 Patel
2008/0274796 A1 11/2008 Lube
2008/0274798 A1 11/2008 Walker et al.
2008/0311980 A1 12/2008 Cannon
2008/0318668 A1 12/2008 Ching
2009/0011827 A1 1/2009 Englman
2009/0023489 A1 1/2009 Toneguzzo
2009/0023492 A1 1/2009 Erfanian
2009/0061974 A1 3/2009 Lutnick et al.
2009/0061975 A1 3/2009 Ditchev
2009/0061991 A1 3/2009 Popovich
2009/0061997 A1 3/2009 Popovich
2009/0061998 A1 3/2009 Popovich
2009/0061999 A1 3/2009 Popovich
2009/0082093 A1 3/2009 Okada
2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0285869 A1 11/2010 Walker
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0070945 A1 3/2011 Walker
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1* 5/2011 Filipour .................. G07F 17/32 463/27
2011/0130190 A1* 6/2011 Hamman ................ G06F 21/64 463/19
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wicket
2013/0131848 A1 5/2013 Arnone et al.
2013/0190074 A1 7/2013 Arnone et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0357350 A1 12/2014 Weingardt et al.

FOREIGN PATENT DOCUMENTS

JP 2004097610 A 4/2004
JP 2004166746 A 6/2004
WO 9851384 A1 11/1998
WO 2010087090 A1 8/2010
WO 2011109454 A1 9/2011
WO 2012139093 A1 10/2012
WO 2013059308 A1 4/2013

OTHER PUBLICATIONS

U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.

(56) References Cited

OTHER PUBLICATIONS

U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 14/799,481 Arnone, et al. filed Jul. 14, 2015.
U.S. Appl. No. 15/362,214 Arnone, et al. filed Nov. 28, 2016.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.

(56) References Cited

OTHER PUBLICATIONS

U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
International Search Report and Written Opinion, PCT/US2013/38045, dated Aug. 9, 2013.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

* cited by examiner

DRAW CERTIFICATE BASED HYBRID GAME

CROSS-REFERENCE TO RELATED APPLICATIONS

This application is a continuation of U.S. patent application Ser. No. 14/255,253, filed Apr. 17, 2014, which is a continuation of Patent Cooperation Treaty Application No. PCT/US2013/038045, filed Apr. 24, 2013 which claims the benefit of U.S. Provisional Patent Application No. 61/638,063 filed on Apr. 25, 2012, the contents of each of which are incorporated by reference herein.

FIELD OF THE INVENTION

Embodiments of the present invention are generally related to gaming and more specifically to draw certificate based hybrid games that include both an entertainment game and a gambling game where a wager in the gambling game is resolved by a draw certificate received from a remote provider.

BACKGROUND OF THE INVENTION

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based.

SUMMARY OF THE INVENTION

A draw certificate hybrid game system is provided. In one embodiment, the draw certificate hybrid game system, comprises a computing device constructed to: request a plurality of encrypted draw certificates from a draw server via a network, each encrypted draw certificate representing a wager outcome; present an entertainment game of skill to a player, wherein the entertainment game has wagering events initiated by the player; determine a wagering event has been initiated by the player in the entertainment game; request from the draw server an authentication result, wherein the draw server determines the authentication result by decrypting an encrypted draw certificate from the plurality of encrypted draw certificates; determine a wager result from the authentication result; provide the wager result to the player within the entertainment game when the authentication result for the encrypted draw certificate is transmitted by the draw server; and determine a change the entertainment game based on the wager result; and the draw server connected to the computing device via the network, wherein the draw server is constructed to: communicate the plurality of draw certificates to the computing device responsive to a request from the computing device; and authenticate the plurality of draw certificates responsive to a request from the computing device.

In various embodiments, the request for the encrypted draw certificate by the computing device includes identification information and receives the encrypted draw certificate in response to the draw server authenticating the user with a player authentication server.

In numerous embodiments, the computing device is further constructed to resolve the wager by: requesting redemption of the encrypted draw certificate from a redemption server that has received a copy of the encrypted draw certificate wherein the request includes account information; and receiving acknowledgement of the encrypted draw certificate that is redeemed in response to the redemption server settling the account with an authorized clearing house.

In many embodiments, the computing device is further constructed to: receive a plurality of player actions; determine requests for a plurality of wagers and a request to end a player session from the player actions; request a plurality of encrypted draw certificates from the draw server wherein each encrypted draw certificate determines one of the plurality of wagers; receive the plurality of encrypted draw certificates from the draw server; determine the result of each of the plurality of wagers; transmit a request to the draw server to close the player session; and receive an acknowledgement from the draw server that the session has ended and each of the plurality of encrypted draw certificates has been resolved by the draw server determining the outcome of each wager from the plurality encrypted of draw certificates and requesting that an automated account clearing house update a player account in accordance with the outcome of the wagers.

In some embodiments, the wagering event game is a lottery style game and the computing device is constructed to resolve the wager by receiving a notification from the draw server that indicates that the draw server has determined the winner of the wager from the encrypted draw certificates issued for the lottery style game that indicates that the draw server has updated an account of the player using an automated clearinghouse server when the player has won a prize in the lottery style game.

DETAILED DESCRIPTION

Figure 1:
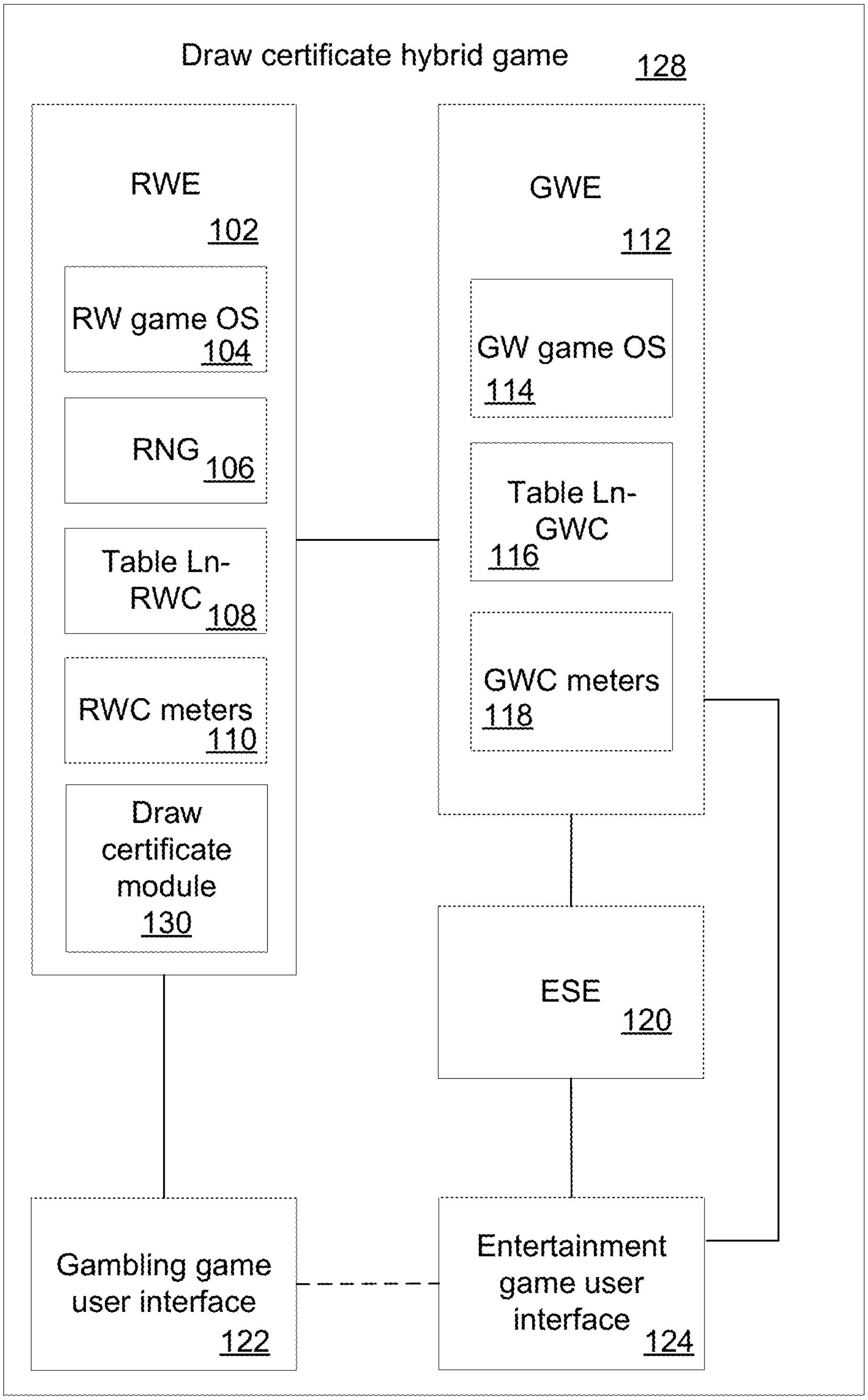
FIG. 1 illustrates a draw certificate based hybrid game in accordance with an embodiment of the invention.

Turning now to the drawings, a mobile device hosting a wagering game that uses centrally determined wagering results is provided in accordance with embodiments of this invention. In accordance with some of these embodiments, the wager game may be a part of a hybrid game. The mobile device is coupled to a data network and the wagering game accesses an external device over the wireless network to receive a draw certificate. The draw certificate includes a draw from a centrally determined pool of wagering outcomes. The mobile device provides the wagering game to a player and uses the draw certificate to determine a wagering outcome for the player. In accordance with some embodiments of this invention, the draw certificate is redeemed by the player using the mobile device. In accordance with other embodiments of this invention, the player is credited with a favorable wagering result when the mobile device requests the draw certificate. In some embodiments of this invention, the draw certificate includes multiple wagering outcomes. In accordance with other embodiments, the wagering outcomes in the draw certificate come from different wagering outcome pools. In accordance with some of the embodiments, each of the wagering outcome pools may have different payout odds. In accordance with some embodiments, the different payout odds are based on an amount to be wagered. In accordance with some embodiments of this invention, the draw certificate is not drawn from a pool of wagering outcomes, but is instead generated by the external device based on one or more results from a random number generator (RNG).

In accordance with some embodiments of this invention, the mobile device is coupled to a game server that transmits a wagering game to the mobile device. The wagering game includes a draw certificate having a centrally determined wagering outcome. The draw certificate includes a draw from a centrally determined pool of wagering outcomes. The mobile device provides the wagering game to a player and uses the draw certificate to determine a wagering outcome for the player. In accordance with some of these embodiments, the draw certificate is redeemed by the player using the mobile device. In accordance with other of these embodiments, the player is credited with a favorable wagering result when the draw certificate is added to the wagering game. In accordance with some of these embodiments, the draw certificate includes multiple wagering outcomes. In accordance with some of these embodiments, each of wagering outcomes in the draw certificate come from different wagering outcome pools. In accordance with a number of embodiments of this invention, the wagering outcome pools have different payout odds. In accordance with several embodiments, the different payout odds are based on an amount to be wagered. In accordance with certain embodiments, the draw certificate is not drawn from a pool of wagering outcomes, but is instead generated by the external device based on one or more results from a random number generator (RNG).

Draw Certificate Hybrid Games

In accordance with many embodiments of this invention, a draw certificate based hybrid game integrates high-levels of entertainment content with a game of skill (entertainment game) and a gambling experience with a game of chance (gambling game). A draw certificate based hybrid game provides for random outcomes independent of player skill while providing that the user's gaming experience (as measured by obstacles/challenges encountered, time of play and other factors) is shaped by the player's skill. The draw certificate is an outcome of a gambling proposition that is determined by an external device such as a draw server. The draw server may receive the draw certificates from a third party via a third party server or may generate the draw certificates using a RNG. A draw certificate based hybrid game in accordance with an embodiment of the invention is illustrated in FIG. 1. The draw certificate based hybrid game 128 includes a real world engine (RWE) 102, a game world engine (GWE) 112, an entertainment system engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the draw certificate based hybrid game 128 and controls and operates the gambling game. The operation of a gambling game is enabled by real world currency (RWC), such as money or other real world funds. A gambling game can increase or decreases an amount of RWC based on random gambling outcomes, where the gambling proposition of a gambling game is typically regulated by gaming control bodies. In many embodiments, the RWE includes a real world (RW) operating system (OS) 104, random number generator or pseudo random number generator (RNG) 106, level n real-world credit pay tables (table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (table Ln-RWC) 108 is a table that can be used in conjunction with a random number generator (RNG) 106 to dictate the RWC earned as a function of sponsored gameplay and is analogous to the pay tables used in a conventional slot machine. Table Ln-RWC payouts are independent of player skill. There can be one table or multiple tables included in Ln-RWC pay tables 108 contained in a gambling game, the selection of which can be determined by factors including (but not limited to) game progress a player has earned, and/or bonus rounds for which a player can be eligible. RWCs are credits analogous to slot machine game credits, which are entered into a gambling game by the user, either in the form of money such as hard currency or electronic funds. RWCs can be decremented or augmented based on the outcome of a random number generator according to the table Ln-RWC real world credits pay table 108, independent of player skill. In certain embodiments, an amount of RWC can be used as criteria in order to enter higher ESE game levels. RWC may be carried forward to higher game levels or paid out if a cash out is opted for by a player. The amount of RWC used to enter a specific level of the game level n need not be the same for each level.

In many embodiments, the use of the RNG 106 and pay tables 108 are replaced through the use of a draw certificate module 130. In such an embodiment, the RW OS 104 uses the draw certificate module to control the reception and use of draw certificates used to resolve wagers as described herein.

In accordance with some embodiments of this invention, the GWE 112 manages the overall draw certificate based hybrid game operation, with the RWE 102 and the ESE 120 effectively being support units to the GWE 112. In accordance with some of these embodiments, the GWE 112 contains mechanical, electronic and software system for an entertainment game. The GWE 112 includes an operating system (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a random number generator. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs may be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs may be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE

102 as to the amount of RWC available in the gambling game. The communication link can also convey a status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of this invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a personal computer (PC), a Sony PlayStation® (a video game console developed by Sony Computer Entertainment of Tokyo, Japan), or Microsoft Xbox® (a video game console developed by Microsoft Corporation of Redmond, Wash.) running a specific entertainment game software program. In accordance with some of these embodiments, ESE 120 can be an electromechanical game system of a draw certificate based hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting portions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special portion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third-person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a draw certificate based hybrid game integrates a video game style gambling machine, where the gambling game (including an RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the draw certificate based hybrid game can leverage very popular titles with gamers and provides a sea change environment for casinos to attract players with games that are more akin to the type of entertainment that a younger generation desires. In accordance with various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, draw certificate based hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The draw certificate based hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
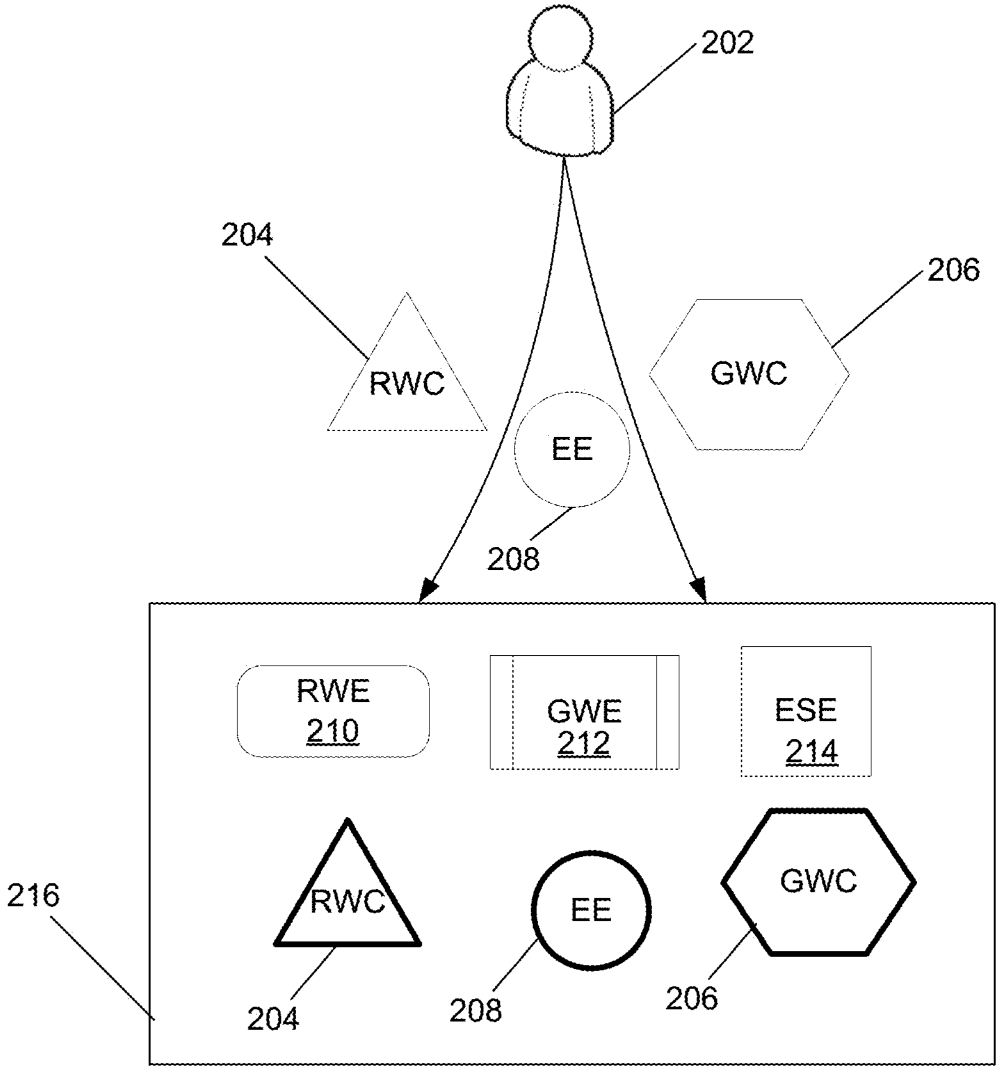
FIG. 2 is a system diagram that illustrates an implementation of a network distributed draw certificate based hybrid game including a game world engine local server in accordance with an embodiment of the invention.

In accordance with some embodiments, a player can interact with a draw certificate based hybrid game by using RWC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RWC and elements, such as but not limited to Entertainment Elements (EE), are utilized in a draw certificate based hybrid game in accordance with an embodiment of the invention is illustrated in FIG. 2. The conceptual diagram illustrates that RWC 204, enabling elements (EE) 208 and GWC 206 can be utilized by a player 202 in interactions with the RWE 210, GWE 212 and ESE 214 of a draw certificate based hybrid game 216. The contribution of elements, such as EE 208, can be linked to a player's access to credits, such as RWC 204 or GWC 206. Electronic receipt of these credits can come via a smart card, voucher or other portable media, or as received over a network from a server. In accordance with certain embodiments, these credits can be drawn on demand from a player profile located in a database locally on a draw certificate based hybrid game or in a remote server.

Figure 3:
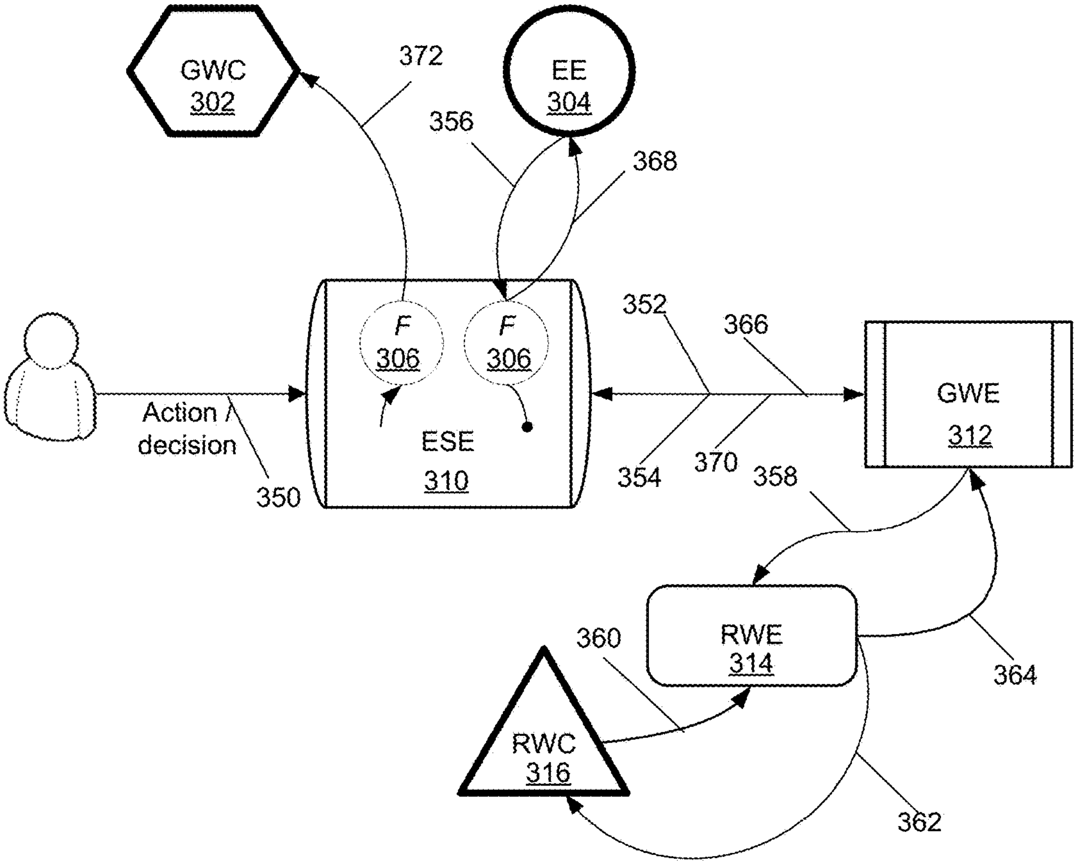
FIG. 3 illustrates a representative state diagram that illustrates an implementation of a network distributed draw certificate based hybrid game in accordance with an embodiment of the invention.

A conceptual diagram that illustrates interplay between elements and components of a draw certificate based hybrid game in accordance with an embodiment of the invention is illustrated in FIG. 3. Similar to FIG. 2, a player's actions and/or decisions can affect functions 306 that consume and/or accumulate GWC 302 and/or EE 304 in an entertainment game executed by an ESE 310. A GWE 312 can monitor the activities taking place within an entertainment game executed by an ESE 310 for gameplay gambling event occurrences. The GWE 312 can also communicate the gameplay gambling event occurrences to an RWE 314 that triggers a wager of RWC 316 in a gambling game executed by the RWE 314.

In accordance with some embodiments of the invention, the following may occur during use of the draw certificate based hybrid game. The user enters an input that represents an action or decision (350). The ESE 310 signals the GWE 312 with the input decision or action (352). The GWE 312 responds by signaling to ESE 310 with the amount of EE that is consumed by the player action or decision (354). The signaling from the GWE 312 configures a function 306 to control the EE consumption, decay, and/or accumulation.

The ESE 310 then adjusts the EE 304 accordingly (356). The GWE 312 signals the RWE 314 as to the profile of the wager proposition associated with the action or decision and triggers the wager (358). The RWE 314 consumes the appropriate amount of RC 316 and executes the wager (360). In accordance with embodiments of this invention, the execution of the wager includes the RWE 314 requesting a draw certificate from a draw server or the like as is discussed further below. The RWE 314 then adjusts the RC 316 based upon the outcome of the wager (362) and informs the GWE 312 as to the outcome of the wager (364).

The GWE 312 signals the ESE 310 to adjust EE to one or more of the EEs of the ESE entertainment game (366). Function 306 of the ESE 310 performs the adjustment of EE 304 (368). The ESE 310 signals the GWE 312 as to the updated status (370). In response, the GWE 312 signals the ESE 310 to update GWC of the entertainment game. The ESE updates the GWC using a function 306 (372).

The following is an example of the above flow in a first-person shooter game, such a Call of Duty®, using a hybrid game sequence in accordance with embodiments of this invention.

The process begins by a player selecting a machine gun to use in the game and then fires a burst of bullets at an opponent (350). The ESE 310 signals the GWE 312 of the player's choice of weapon, that a burst of bullets was fired, and the outcome of the burst (352). GWE 312 processes the information received and signals ESE 310 to consume 3 bullets (EE) with each pull of the trigger (354). The ESE 310 consumes 3 bullets for the burst using function 306 (356).

The GWE 312 signals the RWE 314 that 3 credits (RC) are to be wagered to match the three bullets consumed. The RWE 314 then obtains a draw certificate from a draw server or the like as discussed further below and determines the result of the wager and may determine the winnings from a pay table. On a particular pay table (Table Ln-RC), a determination is made by RWE 314 as to the amount of damage that the opponent has sustained. The RWE 314 consumes 3 credits of RC 316 for the wager and executes the specified wager (360). The RWE 314 determines that the player hit a jackpot of 6 credits and returns the 6 credits to the RC 316 (362) and signals the GWE 312 that 3 net credits were won by the player (364).

The GWE 312 signals ESE 310 to add 3 bullets to an ammo clip (366). ESE 310 adds 3 bullets back to the ammo clip (EE 304) using a function 306 (368). The ammunition may be added by directly adding the ammunition to the clip or by allowing the user to find extra ammunition during game play. The GWE 312 logs the new player score (GWC 302) in the game (as a function of the successful hit on the opponent) based on the ESE 310 signaling, and the signals the ESE 310 to add 2 extra points to the player score since a jackpot has been won (370). The ESE 310 then adds 10 points to the player score (GWC 302) given the success of the hit which in this example is worth 8 points, plus the 2 extra points requested by GWE 312 (372).

Various embodiments of hybrid games are discussed in Patent Cooperation Treaty Application No. PCT/US11/26768, filed Mar. 1, 2011, the contents of which are hereby incorporated by reference in their entirety.

Draw Certificate Based Hybrid Game Network

Figure 4:
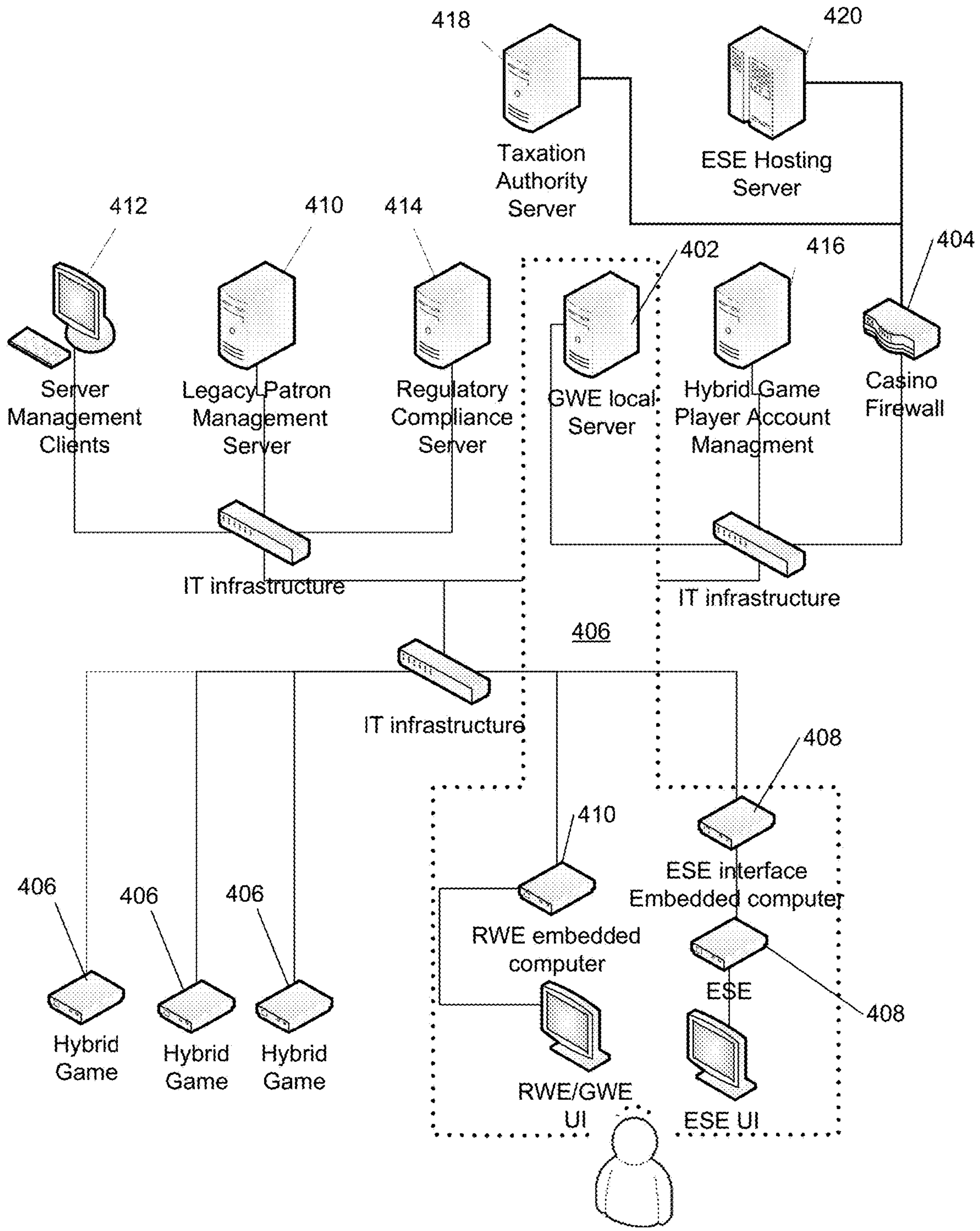
FIG. 4 illustrates a system diagram that illustrates an implementation of an Internet distributed draw certificate based hybrid game in accordance with an embodiment of the invention.

A system diagram that illustrates an implementation of a network distributed draw certificate based hybrid game with a GWE local server in accordance with embodiments of the invention is illustrated in FIG. 4. The system includes several draw certificate based hybrid games 406 sharing services from the same GWE local server 402 over a network. The several draw certificate based hybrid games 406 can be implemented on any device, including laptops, desktop computers, mobile phones, tablets or the like over a network connection. A single draw certificate based hybrid game 406 with a RWE 410, ESE 408 and GWE 402 is enclosed within a dotted line. A number of other peripheral systems, such as, but not limited to, legacy patron management server 410, client management server 412, regulatory compliance server 414, and hybrid game player account management server 416 can also interface with the draw certificate based hybrid games over a network within an operator's firewall 804. Other servers can reside outside the bounds of a network within an operator's firewall 404 to provide additional services for network connected draw certificate based hybrid games. Examples of such servers, include, but are not limited to taxation authority server 418 and ESE hosting server 420. One skilled in the art will recognize that although these systems are represented as one server that one or more connected servers or other processing systems may provide the same function without departing from this invention.

Figure 5:
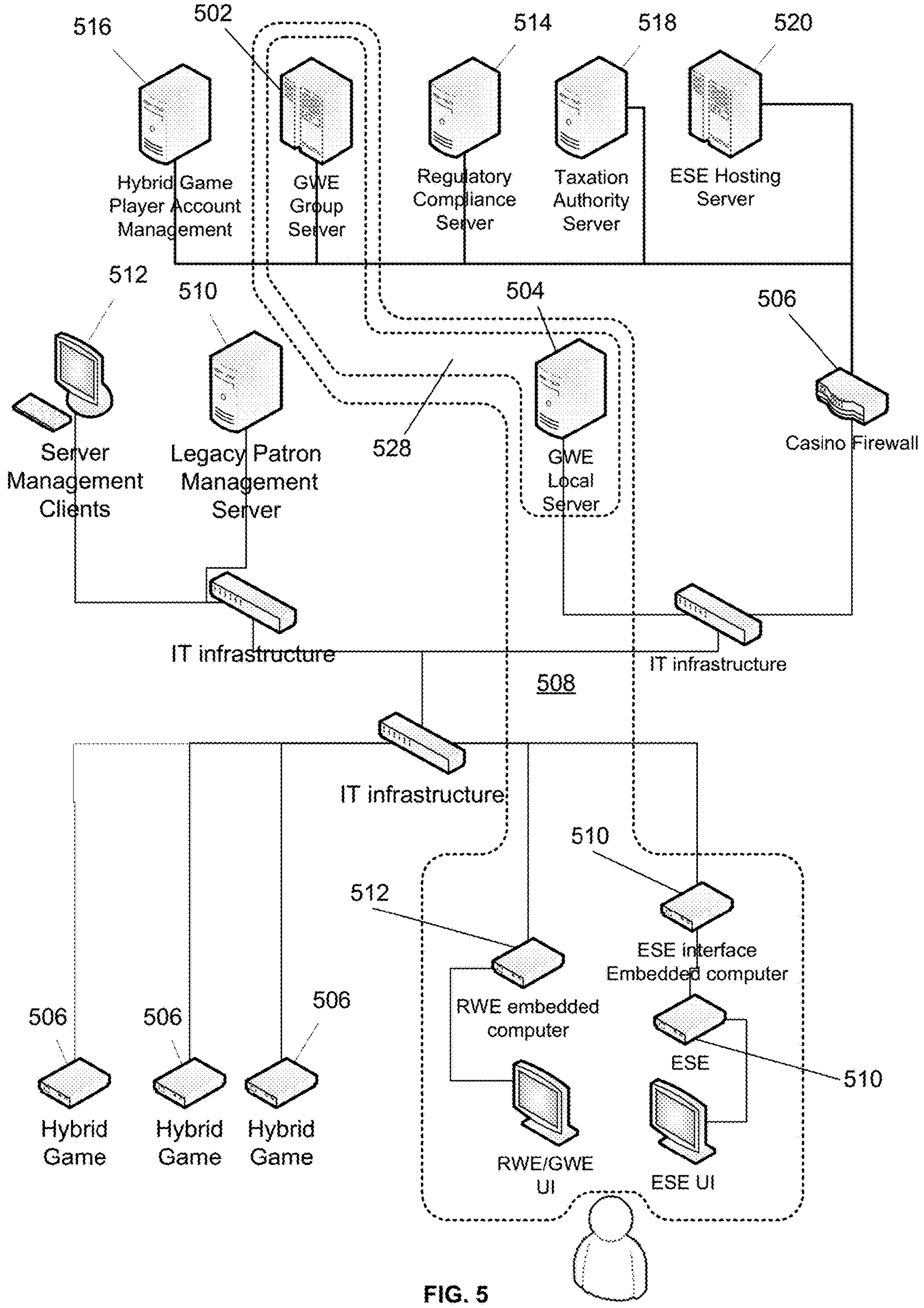
FIG. 5 illustrates a system diagram of a device providing a draw certificate based hybrid game in accordance with an embodiment of this invention.

A system diagram that illustrates an implementation of a network distributed hybrid game with a GWE local server and a GWE group server in accordance with embodiments of the invention is illustrated in FIG. 5. This system includes a draw certificate based hybrid game that includes a RWE 512, ESE 510 and GWE local server 504 as shown enclosed within a dotted line but where a single hybrid game can call upon services from servers within an operator's firewall 506 (such as, but not limited to, a GWE local server 504) as well as beyond an operator's firewall 506 (such as, but not limited to, a GWE group server 502). The GWE group server 502 can coordinate multiple draw certificate based hybrid games from across a network that spans beyond an operator's firewall 506. A GWE server system 518 can include multiple GWE servers, such as, but not limited to, a GWE local server 504 and a GWE group server 502. Multiple network connected hybrid games can be implemented using various computing devices 506 (such as but not limited to laptops, desktop computers, mobile phones, PDAs or tablets) and be connected to various servers to call upon services that enable the execution of the hybrid game. These servers include but are not limited to client management server 510 and legacy patron management server 510 within the casino firewall 506; and regulatory compliance server 514, hybrid game account management server 516, taxation authority server 518 and ESE hosting server 520 outside the casino firewall 506. One skilled in the art will recognize that servers may be single servers or a group of servers and processing systems providing the services without departing from this invention; and that the servers described may be within or outside of casino firewall 506 without departing from this invention.

Figure 6:
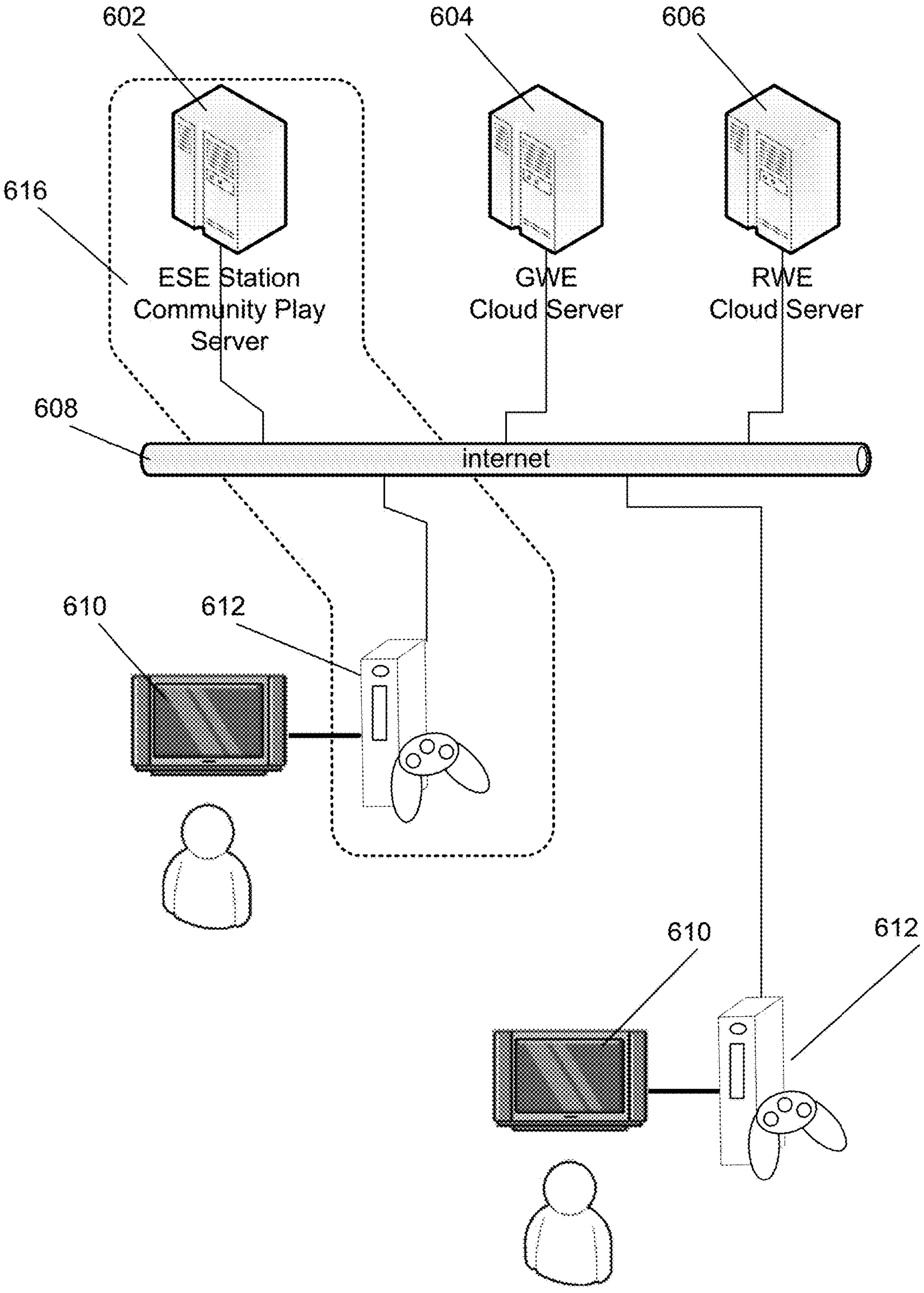
FIG. 6 illustrates a conceptual diagram that illustrates how resources are utilized in a draw certificate based hybrid game in accordance with an embodiment of this invention.

A system diagram that illustrates an implementation of network distributed hybrid games over the Internet in accordance with an embodiment of the invention is illustrated in FIG. 6. The system includes an ESE server 602, GWE server 604 and RWE server 606 that each connect to a user interface 610 (such as, but not limited to, a television screen, computer terminal, tablet, touchscreen or PDA) of draw certificate based hybrid games over the Internet 608. Each draw certificate based hybrid game includes a local ESE 612 that also interfaces with a remote ESE server 602. Processes performed by an ESE 616 services can be performed in multiple locations, such as, but not limited to, remotely on an ESE server 602 and locally on a local ESE 612.

Processing Apparatuses

Figure 7:
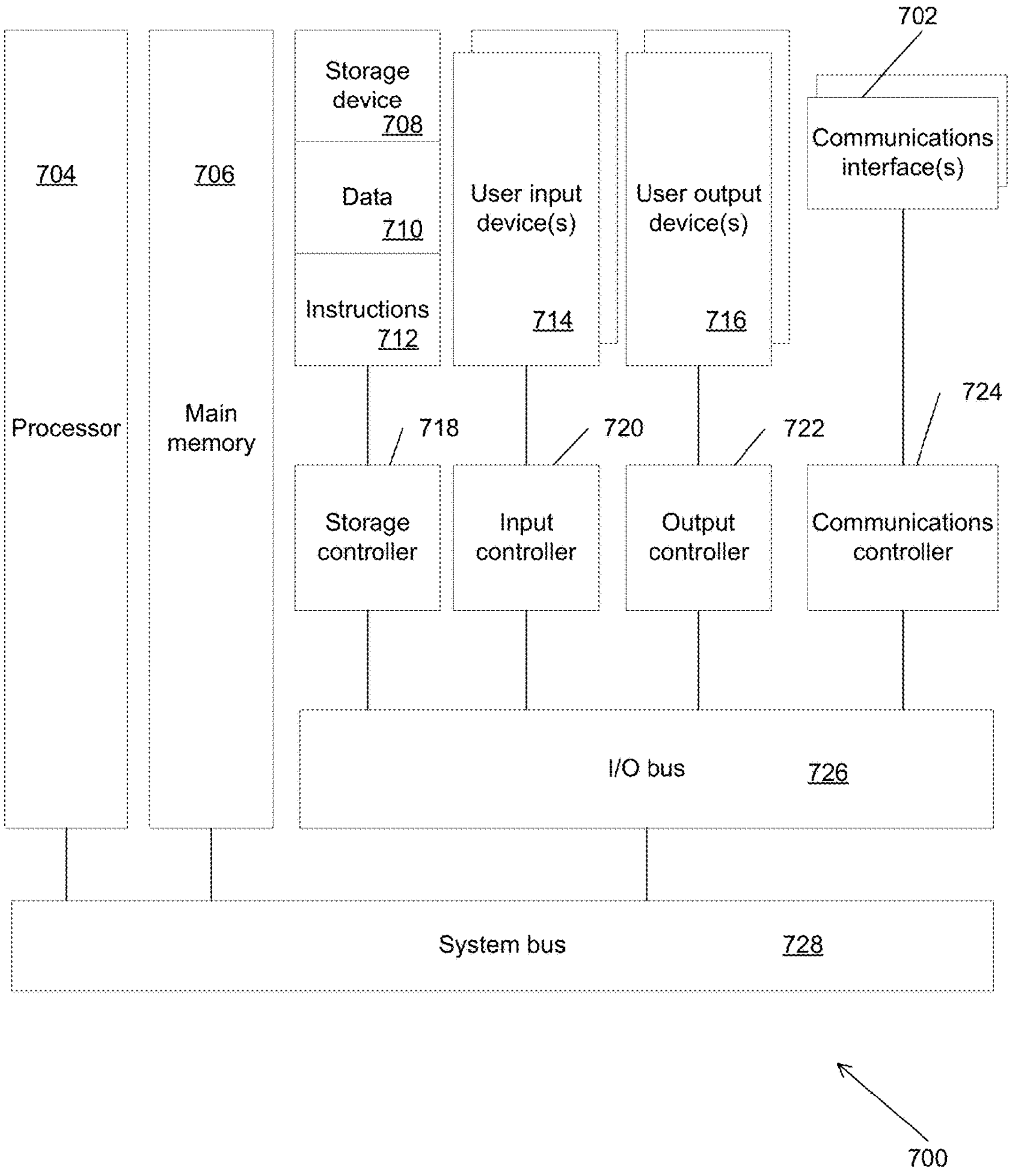
FIG. 7 illustrates a conceptual diagram that illustrates interplay between resources and components of a draw certificate based hybrid game in accordance with an embodiment of this invention.

Any of a variety of processing apparatuses can host various components of a draw certificate based hybrid game in accordance with embodiments of the invention. In accordance with embodiments of this invention, these processing apparatuses can include, but are not limited to, a server, a gaming machine, a general purpose computer, a computing device and/or a controller. A processing apparatus that is constructed to implement a component of a draw certificate based hybrid game, in accordance with various embodiments of the invention, is illustrated in FIG. 7. In the processing apparatus 700, a processor 704 is coupled to a memory 706 by a bus 728. The processor 704 is also coupled to non-transitory processor-readable storage media, such as a storage device 708 that stores processor-executable instructions 712 and data 710 through the system bus 728 to an I/O bus 726 through a storage controller 718. The processor 704 is also coupled to one or more interfaces that can be used to connect the processor to other processing apparatuses as well as networks as described herein. The processor 704 is also coupled via the bus to user input devices 714, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 704 is connected to these user input devices 714 through the system bus 728, to the I/O bus 726 and through the input controller 720. The processor 704 is also coupled via the bus to user output devices 1516 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 704 is coupled to tactile output devices like vibrators, and/or manipulators. The processor 704 is connected to output devices from the system bus 728 to the I/O bus 726 and through the output controller 722. The processor 704 can also be connected to a communications interface 702 from the system bus 728 to the I/O bus 726 through a communications controller 724.

In accordance with various embodiments, a processor 704 can load instructions and data from the storage device into the memory 706. The processor 704 can also execute instructions that operate on the data to implement various aspects and features of the components of a draw certificate based hybrid game. The processor 704 can utilize various input and output devices in accordance with the instructions and the data in order to create and operate user interfaces for players or operators of a draw certificate based hybrid game (such as but not limited to a casino that hosts the draw certificate based hybrid game).

Although the processing apparatus 700 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 704 through one of the interfaces or over a network. Furthermore, any of the user input devices or user output devices can be coupled to the processor 704 via one of the interfaces or over a network. In addition, although a single processor 704 is described, those skilled in the art will understand that the processor 704 can be a controller or other computing device or a separate computer as well as be composed of multiple processors or computing devices.

Figure 8:
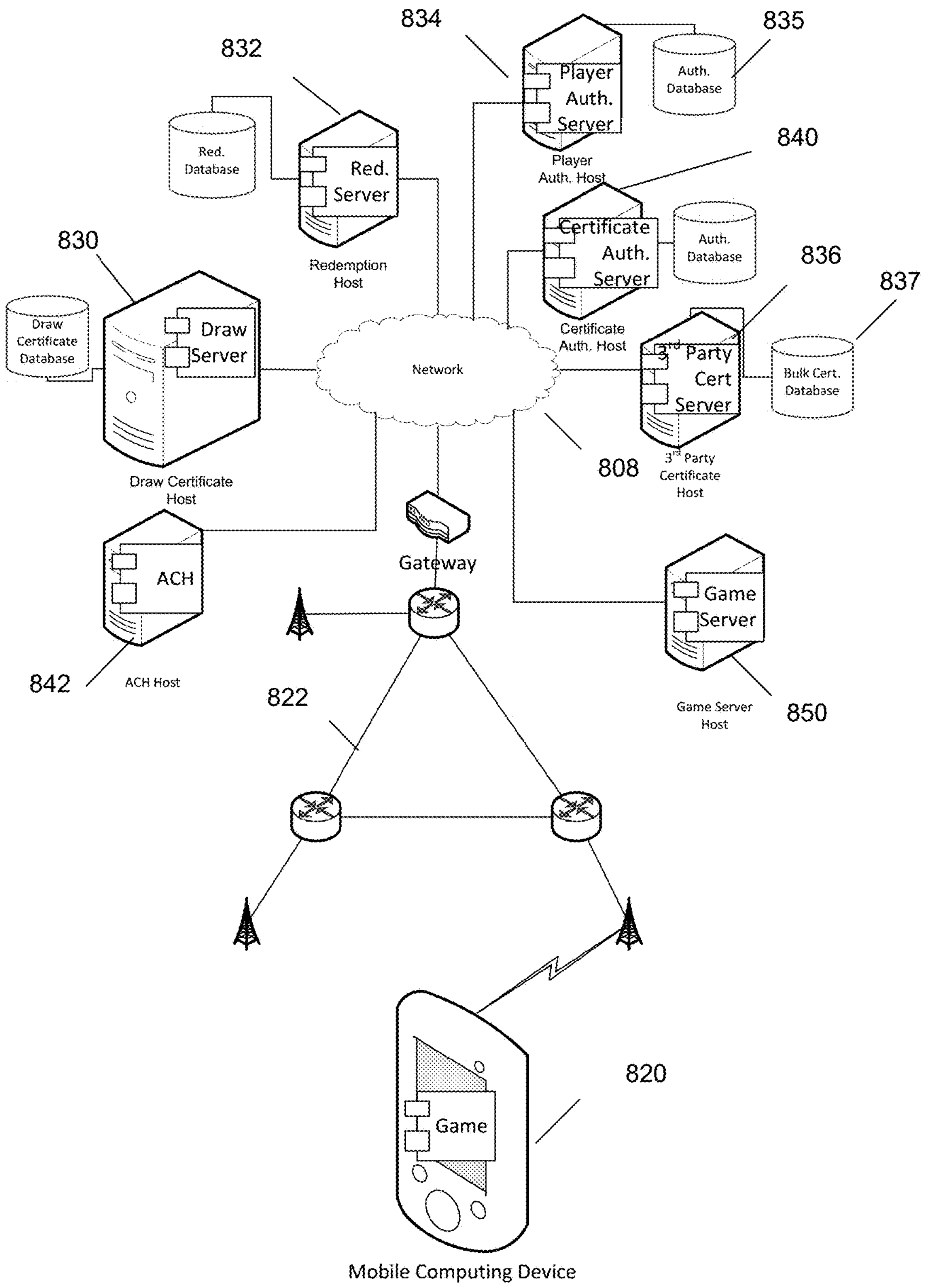
FIG. 8 illustrates a system diagram that illustrates an implementation of a network distributed draw certificate based hybrid game with a user interface provided by a mobile device in accordance with an embodiment of the invention.

A system diagram that illustrates an implementation of a network distributed draw certificate based hybrid game with a mobile device user interface in accordance with an embodiment of the invention is illustrated in FIG. 8. The system diagram illustrates that a network connected draw certificate based hybrid games 804 can be connected to a network 808 to draw upon services from game server system 850. The game server system may include one or more of a RWE server, GWE server or an ESE server. As shown in the illustrated embodiment, the wireless device 820 device may be via a wireless network 822 to the network 808. The network 808 may be a wired, a wireless, or combination of wired and wireless network. The draw certificate based hybrid game can be implemented on any connected mobile device, such as, but not limited to, a smart phone, a personal digital assistant (PDA), a tablet computer, or the like. The wireless device 820 is operatively connected via a network, such as a wireless data network, to an external device that makes determinations regarding wagering outcomes, such as a draw server 830 hosted by a draw host. The draw server 830 provides draw certificates to the mobile device 820 for the wagering game being played on the mobile device 820. The draw certificates include one or more wagering outcomes as determined by a central determination device as described herein.

The network 808 may also include a redemption server 832 hosted by a redemption host and operable to access a redemption database of draw certificates. The redemption server is used to redeem a draw certificate by a player using the mobile device 820 as described herein.

The network 808 may also include an authentication server 834 hosted by an authentication host. The authentication server 834 may also be operatively connected to an authorization database 835 holding information about draw certificates to be authorized. The authentication server 834 may be accessed to provide authentication of a draw certificate. In addition, the authentication server 834 may also provide authorizations for the player and/or the mobile device 820.

The network may also include a third party certificate server 836 hosted by a 3rd party certificate host. The third party certificate server 836 is further operatively connected to a draw certificate database 837 holding information about draw certificates issued by the third party certificate server. The third party certificate server is operable to issue draw certificates, either singly or as a set including multiple draw certificates.

The network 808 may also include a certificate authentication server 840 hosted by a third party certificate host or other entity. The certificate authentication server is operable to authenticate a draw certificate issued to a game when the certificate is issued and/or when a draw certificate is redeemed or paid out. The network 808 may further include an automated clearing house (ACH) server 842. The ACH server 842 is used to transfer credits between accounts to settle wagers as described further herein.

Figure 9:
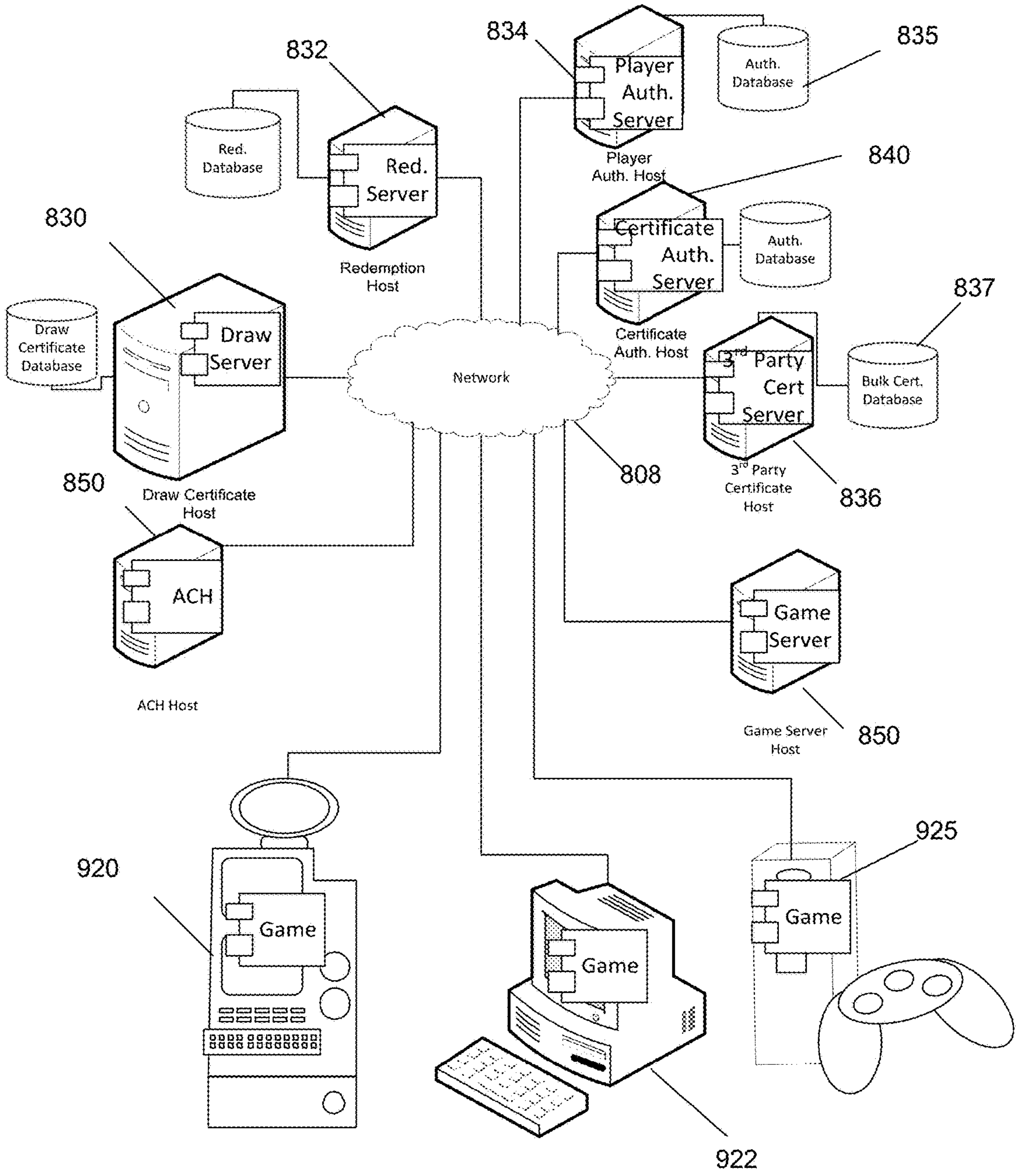
FIG. 9 illustrates a system diagram that illustrates implementations of a network distributed draw certificate based hybrid game with user interfaces provided by local devices in accordance with an embodiment of the invention.

A system diagram that illustrates an implementation of a network distributed draw certificate based hybrid game with a local device user interface in accordance with an embodiment of the invention is illustrated in FIG. 9. The system illustrated is similar to the system illustrated in FIG. 8 and described above. However, the draw certificate hybrid game is provided by a local device that may be a gambling machine 920, a general purpose computer 922, a gaming console 925 or any other similar device. As shown, the gambling machine 920, general purpose computer 922 and a gaming console 925 are connected to network 808 via wired or wireless connection. The remaining components connected to network 808 are described above with reference to FIG. 8.

Figure 10:
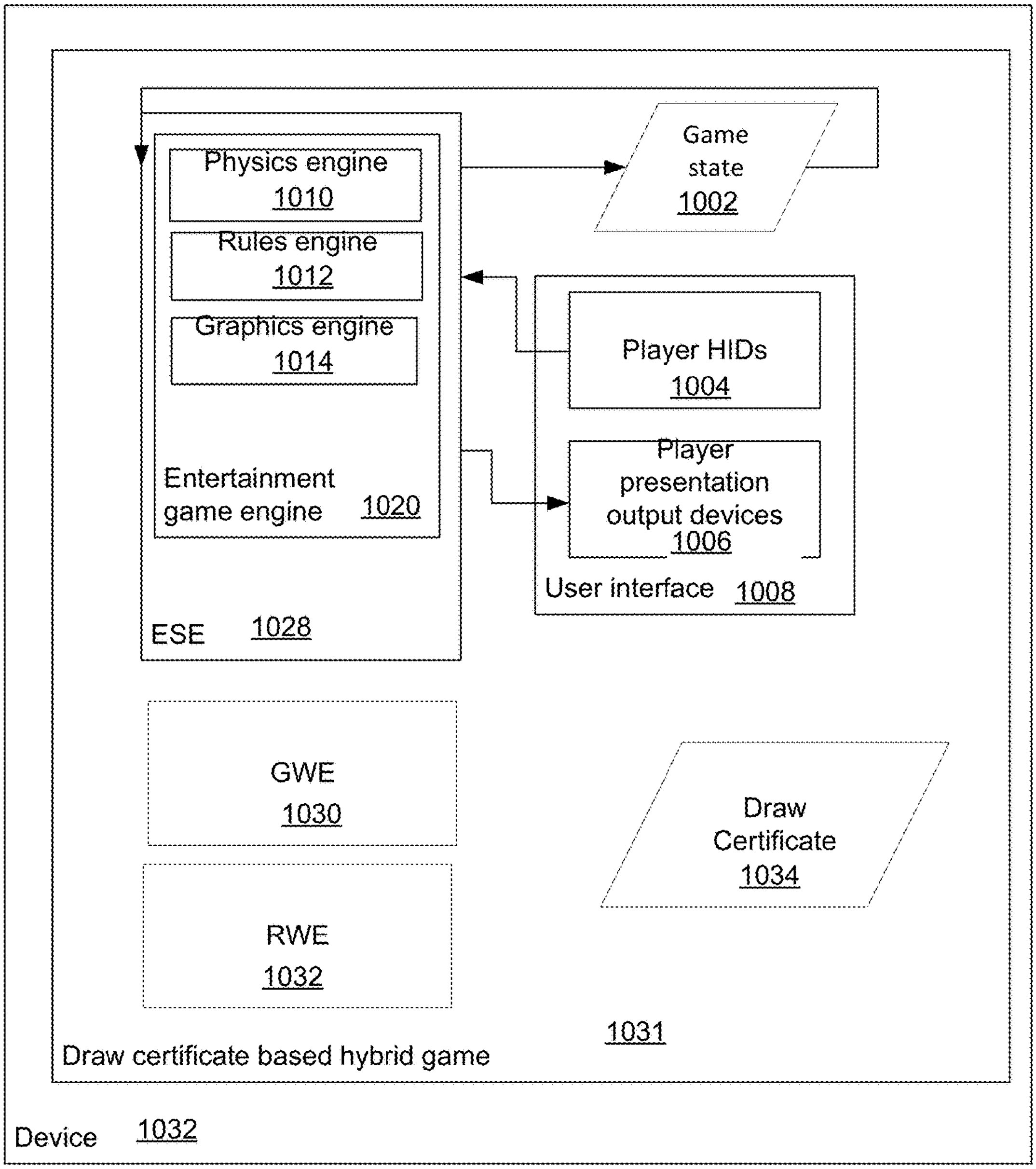
FIG. 10 is a conceptual diagram that illustrates various components of a draw certificate based hybrid game in accordance with an embodiment of the invention.

A conceptual diagram that illustrates various components of a draw certificate based hybrid game in accordance with embodiments of the invention is illustrated in FIG. 10. The conceptual diagram illustrates that a device 1032 can provide hardware on which the draw certificate based hybrid game 1031 can execute. The draw certificate based hybrid game can include an ESE 1028 that utilizes an entertainment game engine 1026 to execute an entertainment game. The ESE 1028 can reference stored game state information 1002 that describes at least one game state which can be used by the ESE 1028 in generating an entertainment game. The ESE 1028 can also interact with a user interface 1008 that includes player presentation output devices 1006 that can provide audio, visual or tactile information concerning the entertainment game (such as but not limited to a screen that provides information concerning a player's entertainment game gameplay progression) and human input devices (HIDs) 1004 in which a player can interact with a draw certificate based hybrid game.

In accordance with some embodiments, the ESE 1028 includes entertainment game engine 1020. The entertainment game engine 1020 can include various components that facilitate the effective execution of the entertainment game, such as but not limited to a physics engine 1010, rules engine 1012, graphics engine 1014 and at least one draw certificate 1034 that can be referenced by the real world engine 1032 during the operation of the draw certificate based hybrid game. The physics engine 1010 can be used to simulate physical interactions within an entertainment game. The rules engine 1012 can be used to implement rules within entertainment game gameplay which govern how an entertainment game can be implemented. A graphics engine 1014 can be used to generate a representation of physical interactions within the virtual world of the entertainment game. In accordance with some of these embodiments, an ESE 1028 can utilize multiple game engines that can execute an entertainment game. In accordance with certain of these embodiments, an ESE 1028 can be integrated with a single entertainment game engine.

Issuance of Draw Certificates

Figure 11:
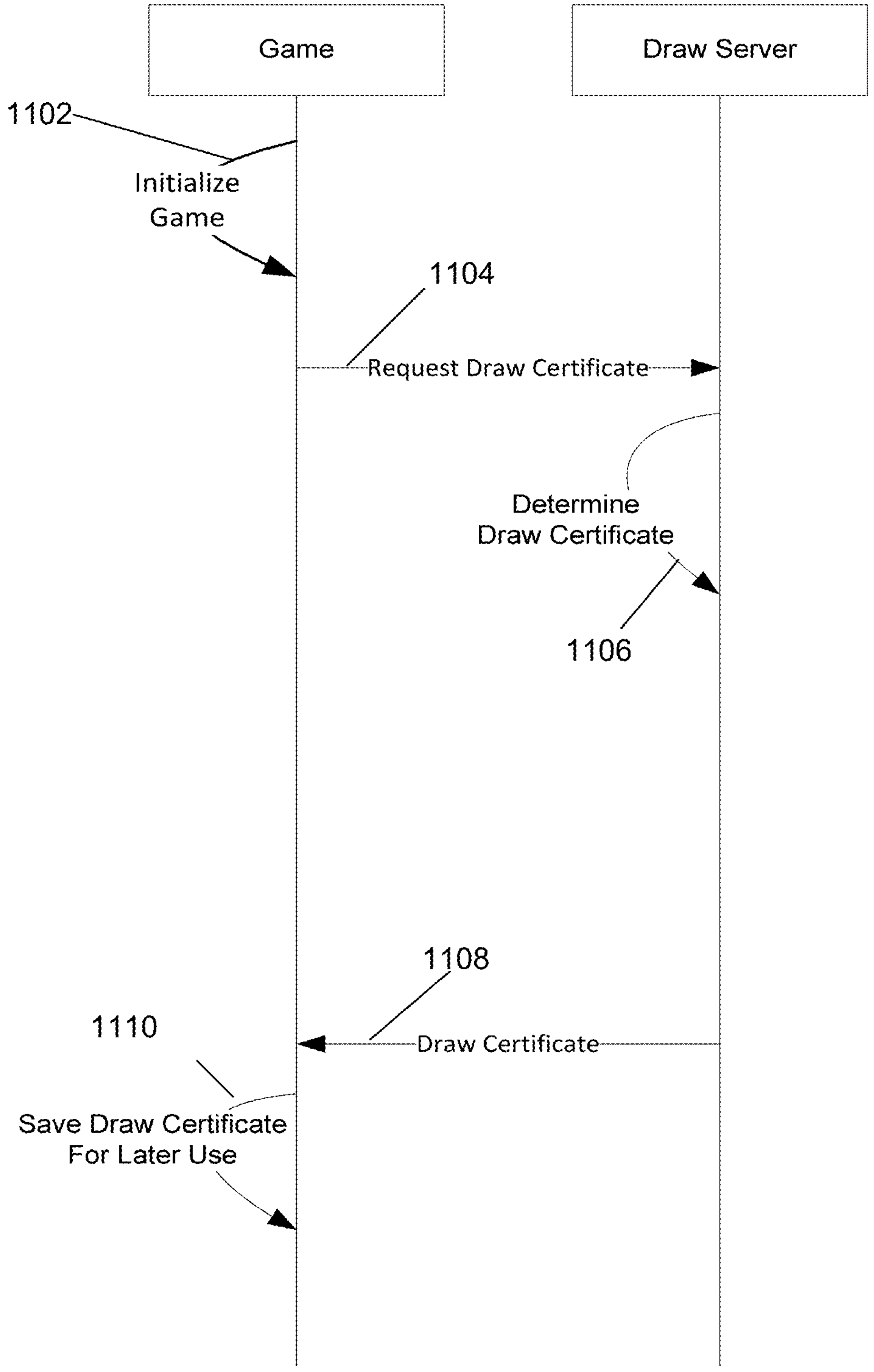
FIG. 11 illustrates a timing diagram for a process for receiving a draw certificate from a draw certificate server in accordance with an embodiment of the invention.

In accordance with several embodiments of the invention, draw certificates are issued by a draw server to resolve gambling propositions. A timing diagram showing the communications between a game similar to a game that is illustrated in FIG. 2 as hosted by computing devices similar to those illustrated in FIGS. 8 and 9, and a draw server similar to that shown in FIGS. 8 and 9 in accordance with embodiments of this invention is illustrated in FIG. 11. During operation of a game, the game is initialized (1102) and the game signals a request through the data network to a draw server (1104). In response, the draw server determines draw information from a draw pool (1106). The draw information is a wagering outcome drawn from a pool of wagering outcomes that have been pre-generated. The pool is finite in size and represents randomly or pseudo-randomly generated wagering outcomes for a series of wagering propositions using known probabilities and player expectations. As the size of the pool is finite and the pool is pre-generated using the known probabilities and player expectations, an operator of a gaming system incorporating the draw server can determine the total amount that players will pay to take all of the draws of the pool, and the total amount of the payouts that will be made to the players, thus ensuring a specific hold for the operator. Furthermore, the player's expectation of a payout is specified and can be clearly communicated to a player. Once the draw certificate is determined, the draw certificate is transmitted to the game by the draw server as a draw certificate (1108). The game may then store the draw certificate for later use as a wagering outcome of a wager made by a player while playing the game as described herein (1110). In accordance with some of these embodiments, the draw information is included in a draw certificate. In accordance with some embodiments, the draw certificate may be encrypted before being sent to the game by the draw server. In accordance with some embodiments, non-encrypted and encrypted versions of the draw certificate are transmitted to the game by the draw server. In accordance with several embodiments, the draw server performs accounting operations as described herein accounting for the draws that are drawn.

Figure 12:
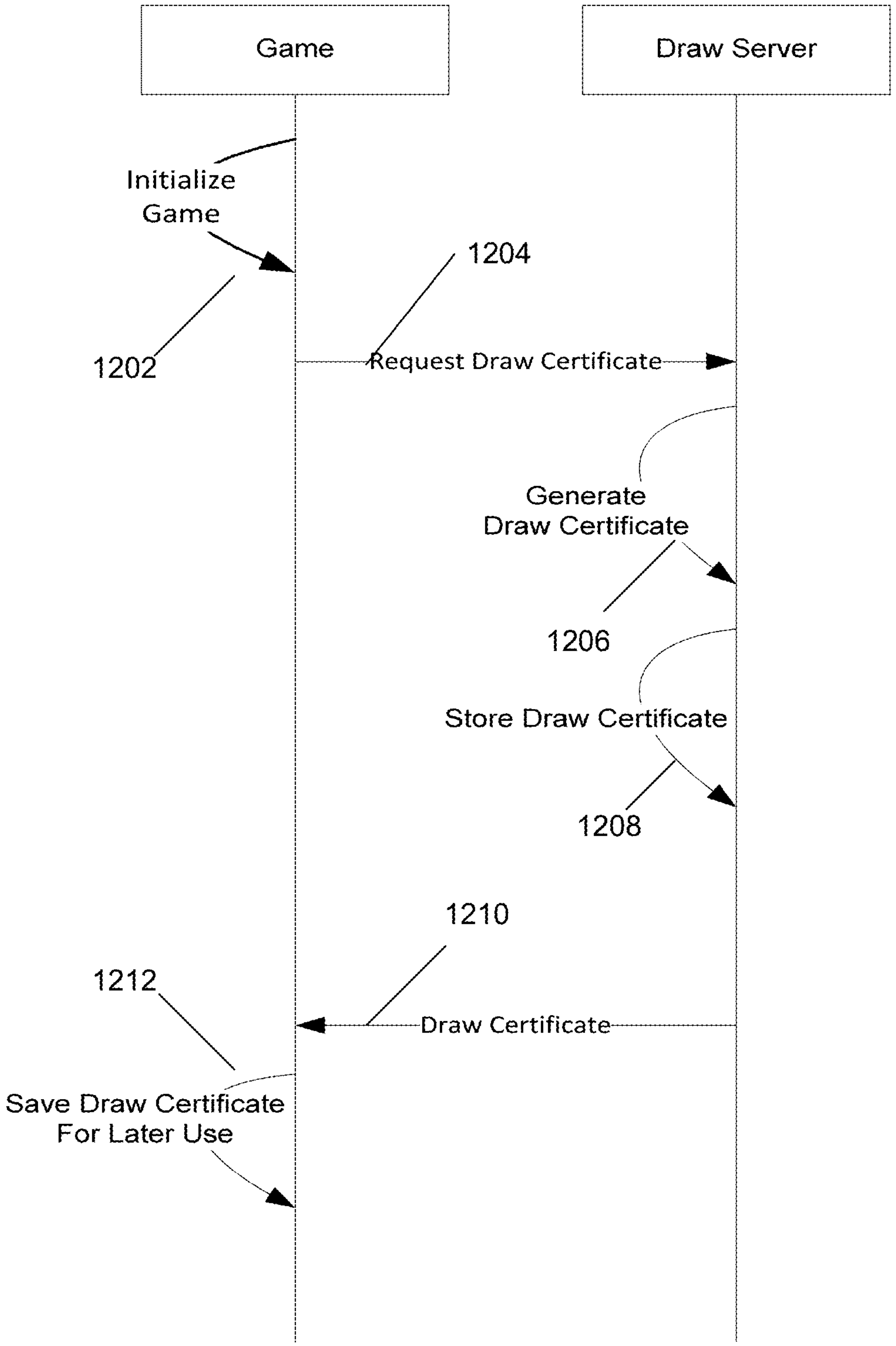
FIG. 12 illustrates a timing diagram for a process for receiving a draw certificate from a draw server where the draw certificate is generated at the time of the request in accordance with an embodiment of the invention.

In a number of embodiments of the invention, draw certificates issued by a draw server to resolve gambling propositions, are generated at the time a draw certificate is requested by a draw certificate based hybrid gambling game. A timing diagram showing the communications between the operation of a draw certificate based hybrid gambling game similar to that illustrated in FIG. 2 as hosted by computing devices similar to those show in FIGS. 8 and 9, and a draw server similar to that shown in FIGS. 8 and 9 in accordance with another embodiment of this invention is illustrated in FIG. 12. During operation of a game, the draw certificate based hybrid game is initialized (1202) and the game signals a request through the data network to a draw server (1104). In response, the draw server generates draw information for a draw certificate (1106). The draw information is a wagering outcome drawn from a pool of wagering outcomes that have been pre-generated. The draw certificate includes the draw information and other information needed to resolve a gambling proposition. The draw certificate is then stored locally by the draw server (1208). Once the draw certificate is generated and stored, the draw certificate is transmitted to the game by the draw server as a draw certificate (1210). The draw certificate based hybrid gambling game may then store the draw certificate for later use as a wagering outcome of a wager made by a player while playing the game as described herein (1212). In accordance with a number of embodiments, the draw information is included in a draw certificate. In accordance with some embodiments, the draw certificate may be encrypted before being sent to the game by the draw server. In accordance with several embodiments, non-encrypted and encrypted versions of the draw certificate are transmitted to the game by the draw server. In another accordance with certain embodiments, the draw server performs accounting operations as described herein accounting for the draws that are drawn.

Figure 13:
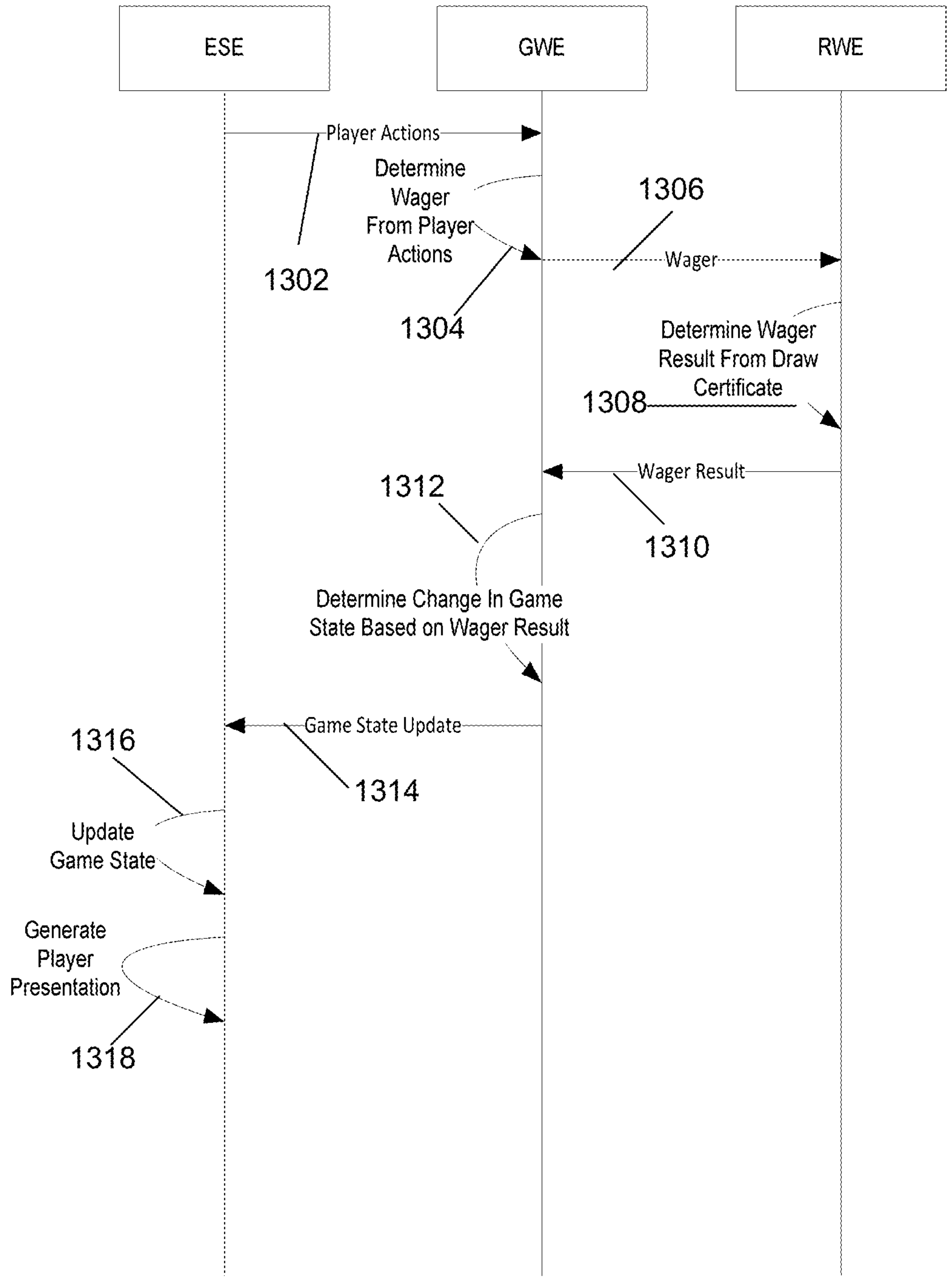
FIG. 13 illustrates a timing diagram of a process for determining an outcome of a wager in a draw certificate based hybrid game in accordance with an embodiment of the invention.

A draw certificate based hybrid game provided by an ESE, GWE, and RWE can use the draw certificate to determine gambling propositions in accordance with embodiments of this invention. A timing diagram of information sent between the engines within a draw certificate based hybrid game and the processes performed by the engines to use draw certificates to resolve gambling propositions in accordance with embodiments of this invention is shown in FIG. 13. During operation of the draw certificate hybrid gambling game by the computing device, an ESE communicates player actions to a GWE while playing the game (1302). The GWE determines if a wager should be triggered based on the player's actions while playing the game as described herein (1304). The GWE sends the wager to an RWE (1306). The RWE receives the wager and determines a wager result using the draw certificate (1308). The wager result is sent to the GWE (1310) and the GWE determines an appropriate change in the game state of the game being played based on the wager result (1312). The GWE sends an update to the game state to the ESE reflecting what needs to be changed in the game state based on the wagering result as determined by the GWE (1314). The ESE updates the game state using the game state update (1316). A game engine then generates a player presentation to the player that reflecting the changed game state (1318).

In accordance with some of these embodiments, the draw is communicated from the draw server to the RWE as a draw certificate including a wagering outcome. In accordance with some embodiments, the draw certificate is communicated as an encrypted document. The draw certificate is stored in the encrypted form on the mobile device until the RWE reads the encrypted draw certificate from storage and decrypts the draw certificate to determine the wagering result.

In accordance with some of these embodiments, the draw certificate includes multiple draws. The RWE uses the multiple draws to generate multiple wagering results that are sent to the GWE in response to successive requests for wagering results from the GWE.

In accordance with some of these, the RWE maintains an open communications link with the draw server for requesting a series of draws from the draw server during a playing session of the game.

In accordance with some embodiments, draws are taken by the draw server from a plurality of pools, rotating the draws between the pools as draws are successively requested by the game.

In accordance with many embodiments, multiple pools are pre-generated using different probabilities and player expectations representing different payout tables for different wagering propositions. For example, one pool may be for making small wagers that have a high probability of resulting in a small payout while another pool may be for making large wagers having a low probability of resulting in very large payouts.

In a number of embodiments, the request for a draw certificate includes an amount wagered within the game. The amount of the wager is then used to determine from which of the multiple pools a draw is taken by the draw server.

In accordance with other embodiments of this invention, pools are not used. Instead, the draw server generates the draw certificate using a random number generator and a payout table in response to receiving a draw certificate request.

In certain embodiments, the draw certificate includes a payout amount.

In several embodiments, the draw certificate includes a value used by the RWE to calculate the wager result.

Figure 14:
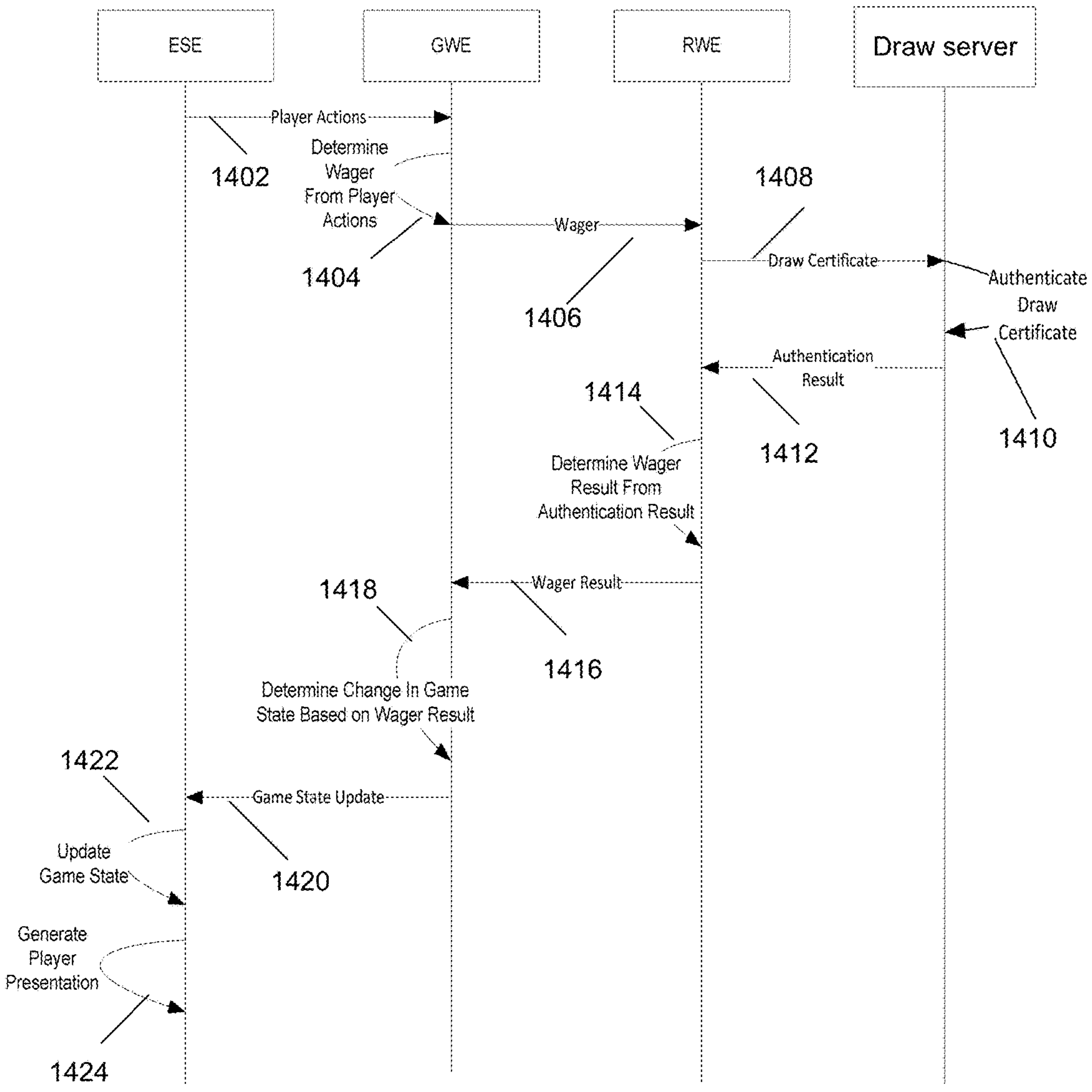
FIG. 14 illustrates a timing diagram of a process for determining an outcome of a wager by requesting a draw certificate from a draw server in a draw certificate based hybrid game in accordance with an embodiment of the invention.

In many embodiments, a draw certificate based hybrid game provided by an ESE, GWE, and RWE authenticates the draw certificate with a redemption server prior to using the draw certificate to determine the outcome of a wagering proposition. A timing diagram for operation of a draw certificate based hybrid game using authenticated draw certificates in accordance with an embodiment of the invention is shown in FIG. 14. A gaming system can use encrypted draw certificates that are encrypted and decrypted by a draw server. During operation of a draw certificate based hybrid game by the mobile computing device, an ESE communicates player actions while playing the game to a GWE (1402). The GWE determines if a wager should be triggered based on the player's actions while playing the game as described herein (1404). The GWE sends the wager to a RWE (1406). The RWE transmits a previously obtained encrypted draw certificate to a draw server (1408). The draw server receives the encrypted draw certificate and decrypts the draw certificate to determine an authentication result (1410). The authentication result indicates whether or not the draw certificate contained a winning wager for the player. The authentication result is transmitted to the RWE (1412). The RWE receives the authentication result from the draw server and determines a wager result from the authentication result (1414).

The wager result is sent to the GWE (1416) and the GWE determines an appropriate change in the game state of the game being played based on the wager result (1418). The GWE sends an update of the game state to the ESE reflecting what needs to be changed in the game state based on the wagering result as determined by the GWE (1420). The ESE updates the game state using the game state update (1422). A game engine then generates a player presentation to the player that reflecting the changed game state (1424).

Figure 15:
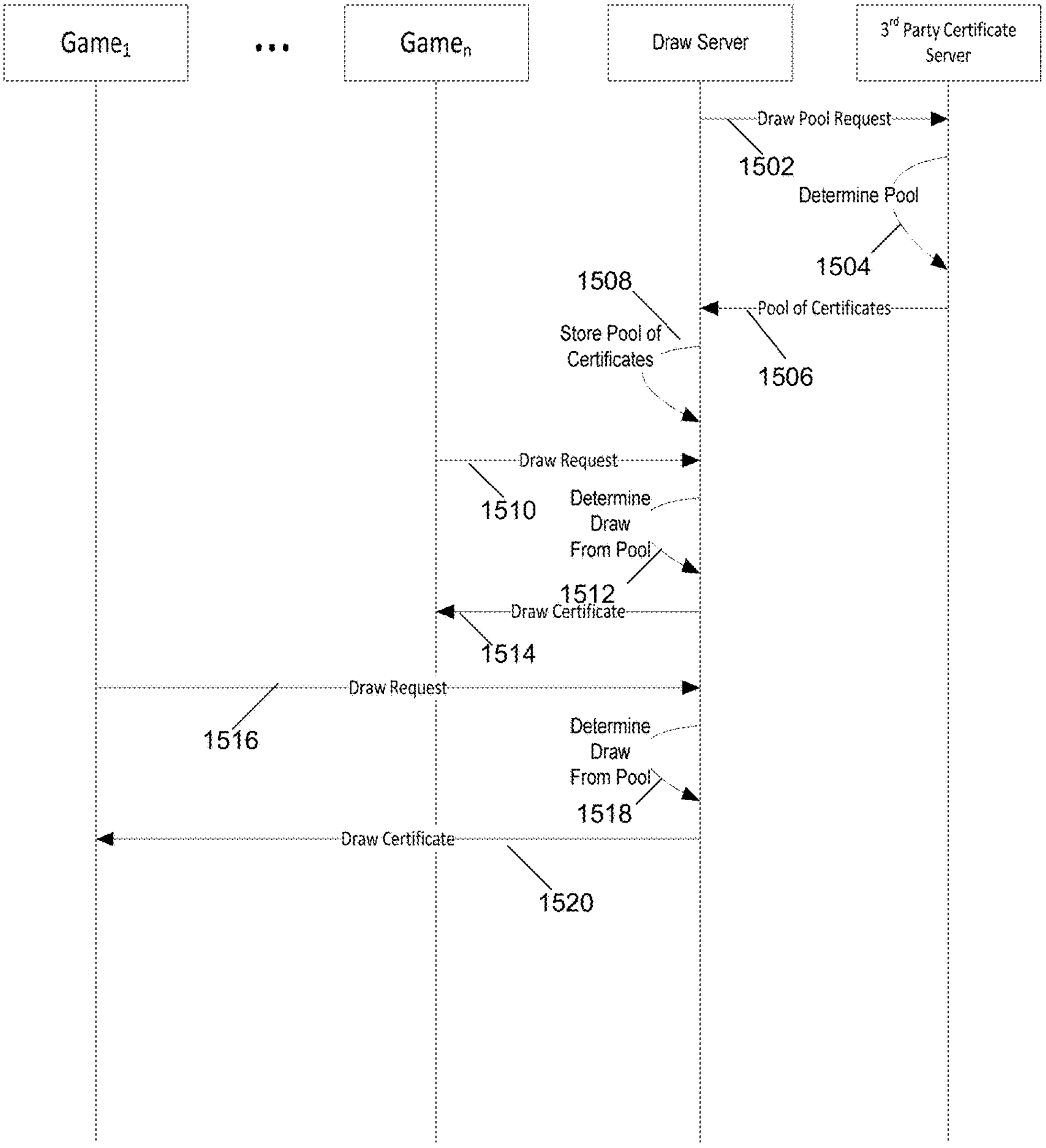
FIG. 15 illustrates a timing diagram of a process for providing draw certificates to multiple draw certificate based hybrid games from a pool of draw certificates in accordance with an embodiment of the invention.

In accordance with some embodiments, the draw certificates provided to a game by a draw server are provided by a third party certificate server. A timing diagram of a process for using draw certificates provided by a third party certificate server in accordance with embodiments of this invention is shown in FIG. 15. In accordance with these embodiments, the draw server does not generate the pool from which draw certificates are taken. Instead, the draw server transmits a request for a draw pool to the third party certificate server (1502). In response, the third party certificate server generates a pool of draw certificates as described herein (1504). The pool of draw certificates is then transmitted by the third party certificate server to the draw server (1506). The draw server receives and stores the pool of certificates for future use (1508). Subsequent to receiving the pool of certificates from the third party certificate server, the draw server receives requests from one or more games for draws (1510,1516) and the draw server determines a draw certificate from the draw pool to satisfy each request (1512,1518) using the draw pool received from the third party certificate server.

In accordance with some of these embodiments, the draw certificates are encrypted by the third party certificate server such that the draw server stores only encrypted draw certificates. The draw server serves the encrypted draw certificates to the one or more draw certificate based hybrid games without decrypting the draw certificates.

Figure 16:
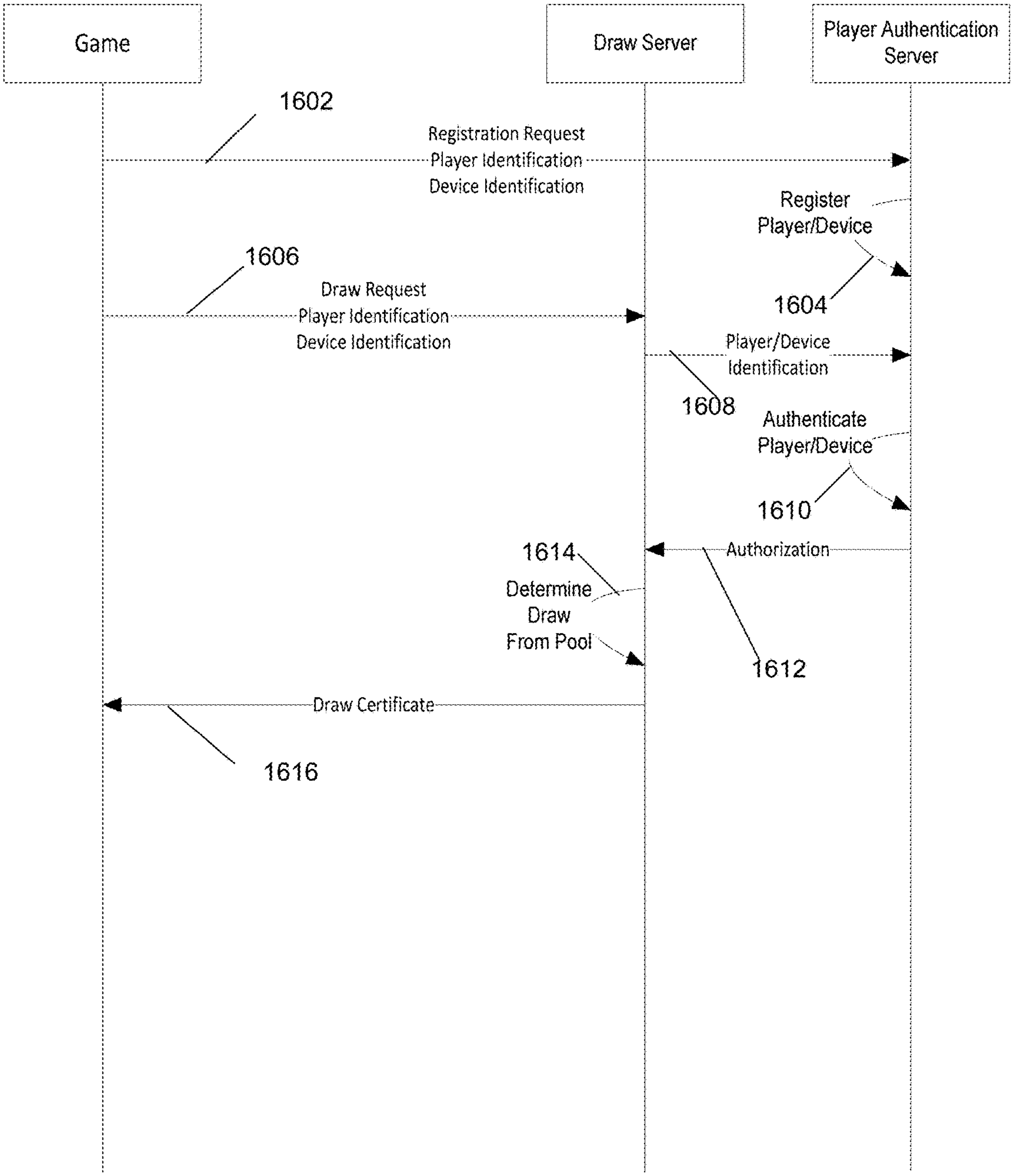
FIG. 16 illustrates a timing diagram of a process for authenticating a player during an issuance of a draw certificate in accordance with an embodiment of the invention.

In accordance with some embodiment of this invention, the draw certificate based hybrid game requires user and/or device authentication to issue a draw certificate. A timing diagram of the operation of a gaming system incorporating a player authentication server in accordance with embodiments of this invention is shown in FIG. 16. Prior to allowing a player to play a game, the draw certificate based hybrid game transmits a registration request to an authentication server (1602). The registration request includes player identification uniquely identifying the player to the gaming system. The authentication server receives the request and registers the player with the gaming system (1604). Subsequently, when a draw certificate based hybrid game being played by the player requests a draw certificate from the draw server (1606), the request includes player information used to authenticate the player. The draw server transmits the player information to the authentication server (1608). In response, the authentication server authenticates the player to the gaming system using the player information (1610) and sends an authorization indication to the draw sever indicating whether or not the player has been authenticated (1612). If the player has been authenticated, the draw server determines a draw certificate from a draw pool (1614) and sends the draw certificate including the draw to the game (1616).

In accordance with several embodiments, a request for player registration and a request for a draw certificate may also include device information uniquely identifying the mobile computing device. The mobile computing device information is associated with the player information such that it is the combination of both the player and mobile computing device that results in authorization for the game to take a draw certificate from the draw server.

Figure 17:
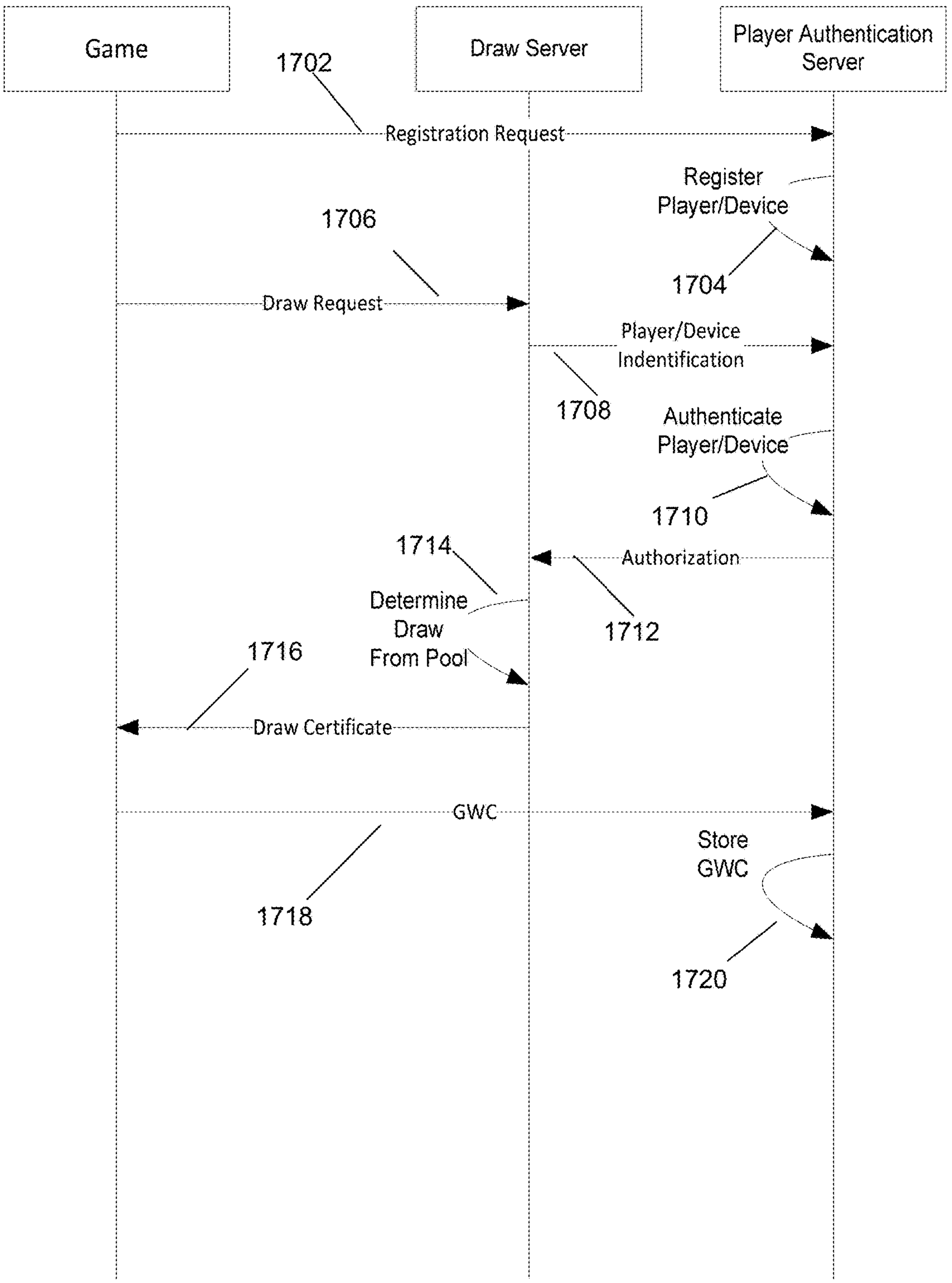
FIG. 17 illustrates a timing diagram of a process for providing game world credits to a user based upon a draw certificate in accordance with an embodiment of this invention.

A timing diagram of the operation of a gaming system incorporating a player authentication server in accordance with other embodiments of this invention is shown in FIG. 17. Prior to allowing a player to play a game, the game transmits a registration request to an authentication server (1702). The registration request includes player identification uniquely identifying the player to the gaming system. The authentication server receives the request and registers the player with the gaming system (1704). Subsequently, when a game being played by the player requests a draw certificate from the draw server, the request includes player information used to authenticate the player (1706). The draw server transmits the player information to the authentication server (1708). In response, the authentication server authenticates the player to the gaming system using the player information (1710) and sends an authorization indication to the draw sever indicating whether or not the player has been authenticated (1712). If the player has been authenticated, the draw server determines a draw from a draw pool (1718) and sends the draw certificate including the draw to the game (1716).

A player playing a game may accumulate GWC as described herein. If so, the game may transmit the GWC to the player authentication server (1718) in order for the player authentication server to store the GWC in association with the player's authentication information (1720).

In accordance with many embodiments, a request for player registration and a request for a draw also include device information uniquely identifying the mobile computing device. The mobile computing device information is associated with the player information such that it is the combination of both the player and mobile computing device that results in authorization for the game to take a draw from the draw server.

Figure 18:
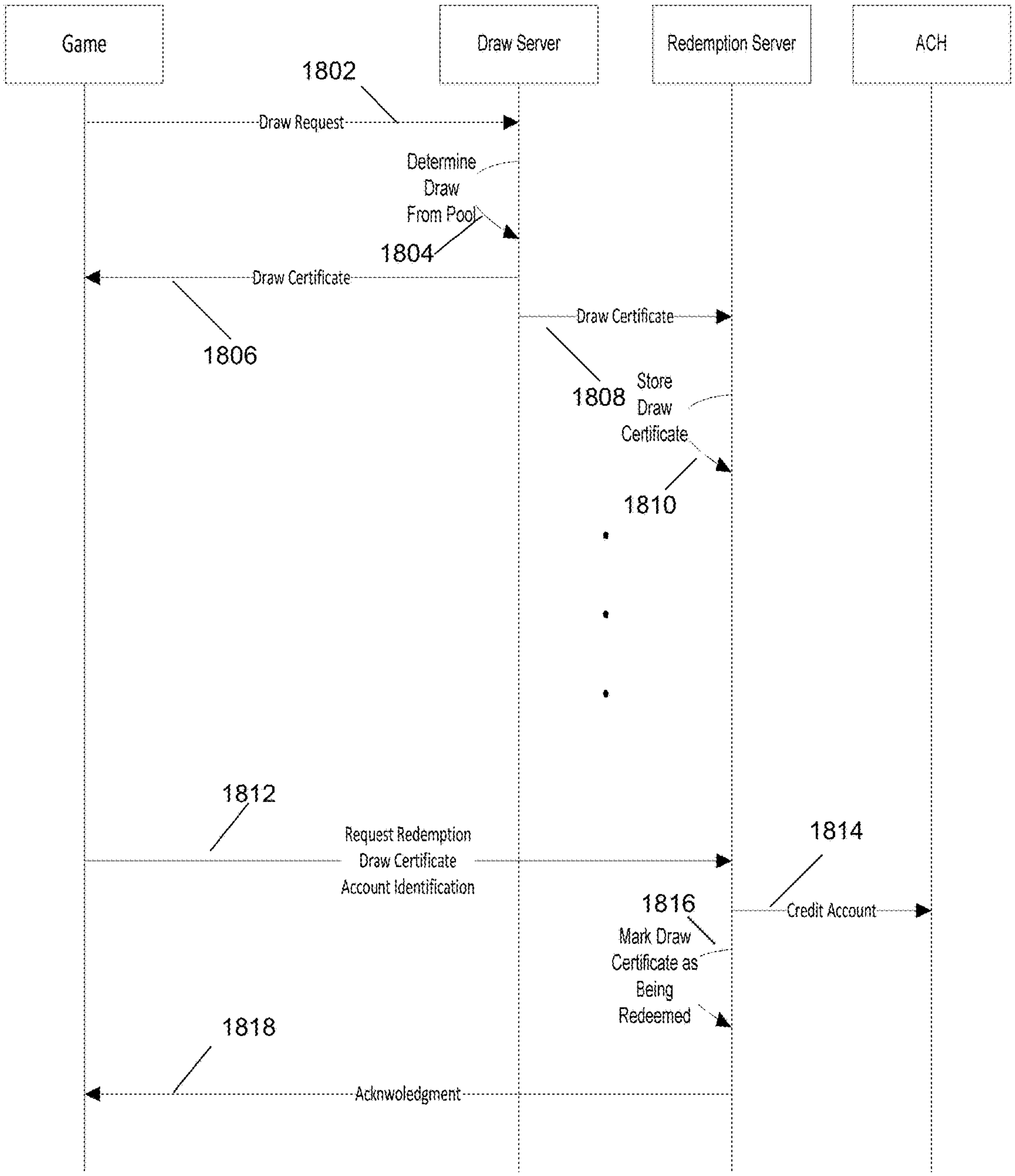
FIG. 18 illustrates a timing diagram of a process for redeeming a draw certificate in accordance with an embodiment of the invention.

In accordance with certain embodiments, a clearing house is used to settle accounts based upon the results of gambling propositions determined by a draw certificate in a draw certificate based hybrid game. A timing diagram of a process for use of a redemption server in redeeming a draw certificate in accordance embodiments of this invention is shown in FIG. 18. A draw certificate based hybrid game transmits a draw request to a draw server (1802). In response to the draw request, the draw server determines a draw certificate from a pool of draws (1804). The draw server transmits the draw certificate to the draw certificate based hybrid game for use by the game as described herein (1806). The draw certificate is also transmitted to the redemption server (1808). The redemption server receives the draw certificate and stores the draw certificate in a database for later use (1810). The draw server and the redemption server repeat this process for each draw certificate that is served by the draw server. The draw certificate based hybrid game may then request redemption of the draw certificate by the redemption server (1812), the request may include the draw certificate. The redemption center receives the draw certificate and determines if the draw certificate is authentic and has not been redeemed, thus validating the draw certificate. If the draw certificate is validated, the redemption server redeems the draw certificate by transmitting a request to an ACH to credit a player account and marks the draw certificate in the database as having been redeemed (1816).

In accordance with some of these embodiments, the request for redemption of the draw certificate includes player information used to identify an account of the player for crediting to the player any wagering outcomes in the player's favor as indicated in the draw certificate. To do so, the redemption server transmits a request to an Automated Clearing House (ACH) server to credit the player's account that is indicated in the request for redemption of the draw certificate (1814). An acknowledgement of the crediting of the account may then be sent from the draw server to the game (1818).

Figure 19:
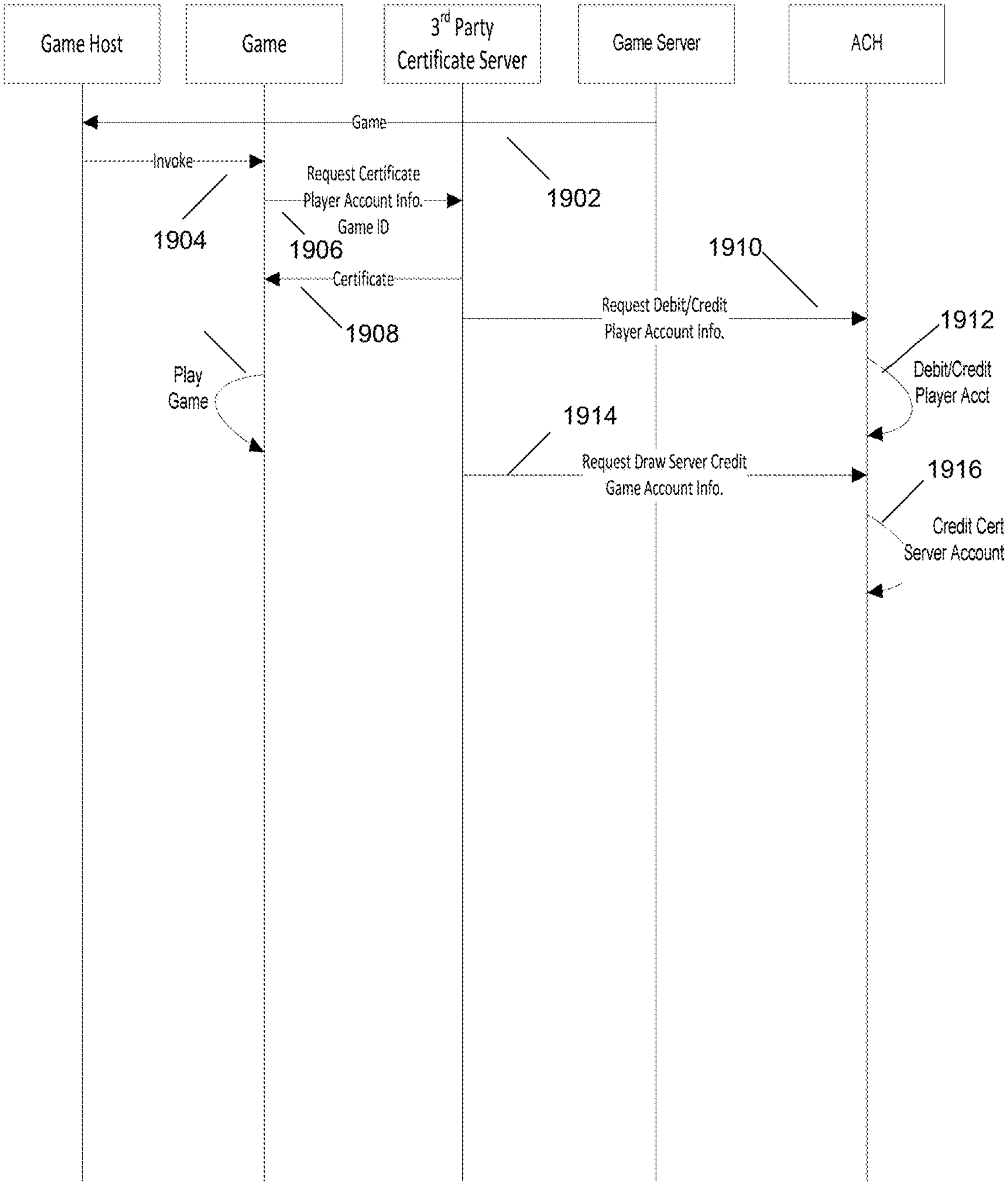
FIG. 19 illustrates a timing diagram of a process for transferring credits from a game provider's account to a user's account based on an outcome determined by a draw certificate issued by a third party server in accordance with an embodiment of the invention.

In accordance with some embodiments of this invention, the draw certificate based hybrid game may transfer credits between accounts maintained on an ACH server when a draw certificate is requested. A timing diagram illustrating a sequence of operations in a draw certificate based hybrid game system that transfer credits using an ACH server when a draw certificate is requested in accordance with embodiments of this invention is shown in FIG. 19. A game server provides a complete draw certificate based hybrid game to a mobile computing device (1902). The draw certificate based hybrid game includes a game engine, ESE, RWE and GWE as described herein. The draw certificate based hybrid game also includes unique identifying information that is used to identify each individual draw certificate based hybrid game that is provided by the game server for accounting and crediting purposes. The mobile computing device invokes the draw certificate based hybrid game when the game is played by a player (1904). When it comes time for the game to request a draw certificate, a request is transmitted to a third party certificate server by the draw certificate based hybrid game (1906). The request includes the information uniquely identifying the game and player account information for debiting the player for the draw certificate. The third party certificate server uses the player information to debit the player for the draw certificate by transmitting a debit/credit request to include the player account information to an ACH or other electronic crediting/debiting system (1910). The ACH debits the player's account and credits an account for the third party certificate server (1912). In addition, the third party certificate server transmits a request for a credit to an account of an operator of the game server (1914). Either the player's account or the account of the third party certificate operator may be debited in order to credit the operator of the game server's account (1916). In this way, an operator of the game server may receive credit for creating and/or distributing a draw certificate based hybrid game without also being responsible for issuing and redeeming draw certificates.

Figure 20:
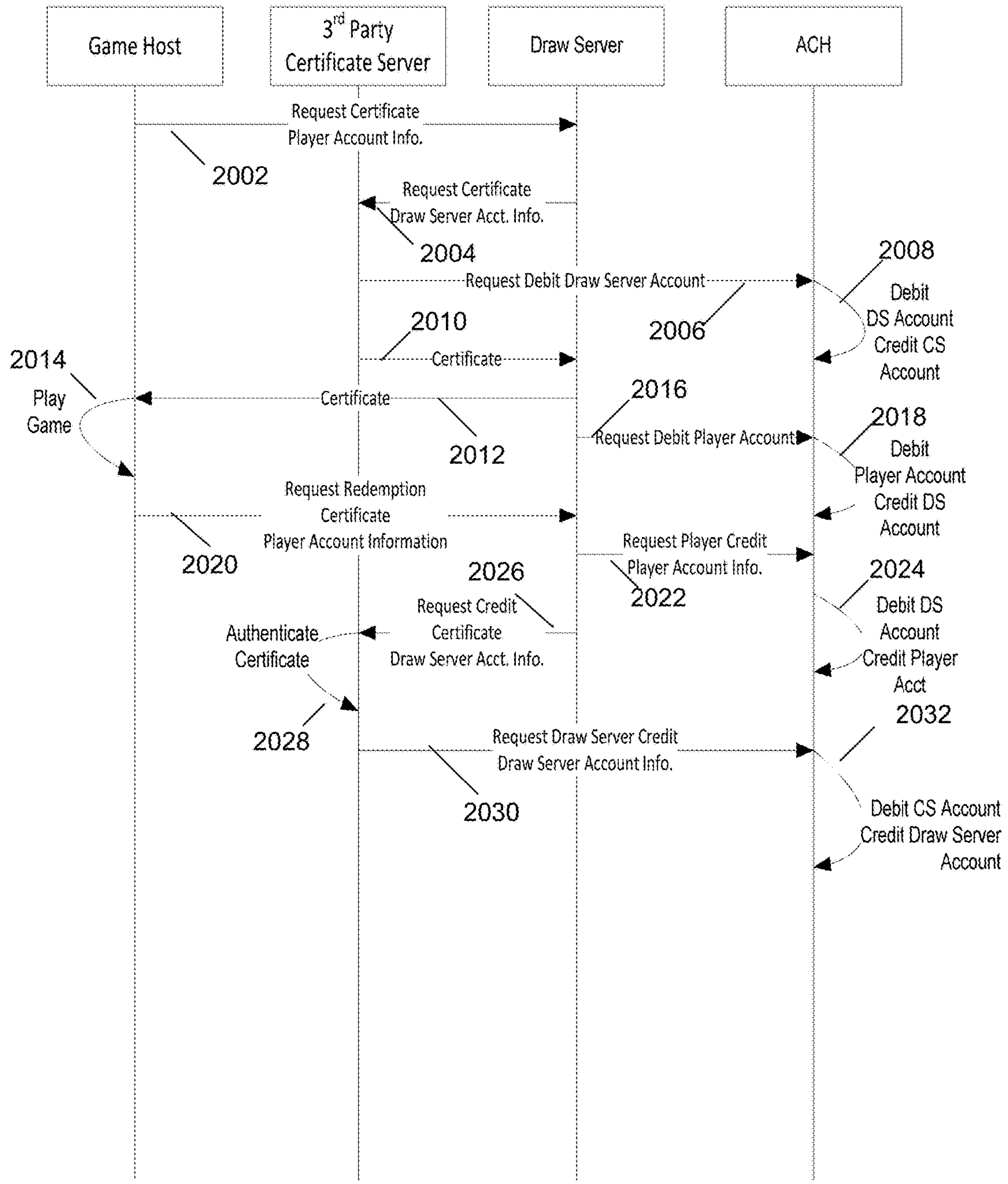
FIG. 20 illustrates a timing diagram of a process for managing player and draw server accounts based on draw certificates issued by a third party server in accordance with an embodiment of the invention.

In accordance with some embodiments of this invention, a draw server acts as a proxy for issuing and redeeming draw certificates issued by a third party certificate server. A timing diagram of a sequence of operations for a draw certificate based hybrid game system that has a draw server acting as a proxy in accordance with some of these embodiments is illustrated in FIG. 20. In accordance with these embodiments, a draw server acts as a proxy for issuing and redeeming draw certificates by a third party certificate server. In operation of the draw certificate based hybrid game system, a draw certificate based hybrid game sends a request to a draw server (2002). The request includes a request for a draw certificate as well as player account information. The draw server requests a draw certificate from the third party certificate server (2004). The request includes information about a draw server account that the third party certificate server may use to debit an account maintained by an operator of the draw server. The third party certificate server uses the draw server account information to request a debit from the draw server's account from an ACH (2006). In response, the ACH debits the draw server's account and credits the third party certificate server's account (2008). The third party certificate server sends the draw certificate to the draw server (2010) and the draw server forwards the draw certificate to the game (2012). The draw server uses the player account information to debit an account of the player and credit an account of the draw server using the ACH (2016, 2018). The game uses the received draw certificate while the player plays the game as described herein (2014).

The draw certificate based hybrid game requests redemption of the draw certificate from the draw server (2020). The request for redemption includes player account information that the draw server uses to credit an account of the player. A request is then sent from the draw server to the ACH server that includes the player account information and amount (2022). The ACH server receives the request and credits the account of the player for the value of the draw certificate (2024). The draw server then transmits the draw certificate to the third party certificate server along with draw server account information that the third party certificate server will use to credit an account of the draw server (2026). The third party certificate server authenticates the draw certificate (2028), and if the draw certificate is authentic, the third party certificate server transmits a request to the ACH server to credit the draw server's account (2030). The ACH server then credits the draw server's account for servicing the game's request for redemption (2032). In this way, the operator of a draw server can be compensated for operating the draw server while server draw certificates from the third party certificate server.

In addition, it should be understood that playing of the game and redemption of the draw certificate can occur at separate times. For example, the player may play the game and then request redemption of the draw certificate at a later time. Furthermore, the draw certificate could be redeemed during the play of the game in accordance with some of these embodiments. In accordance with other of these embodiments, the draw certificate is redeemed before the game is played.

Figure 21:
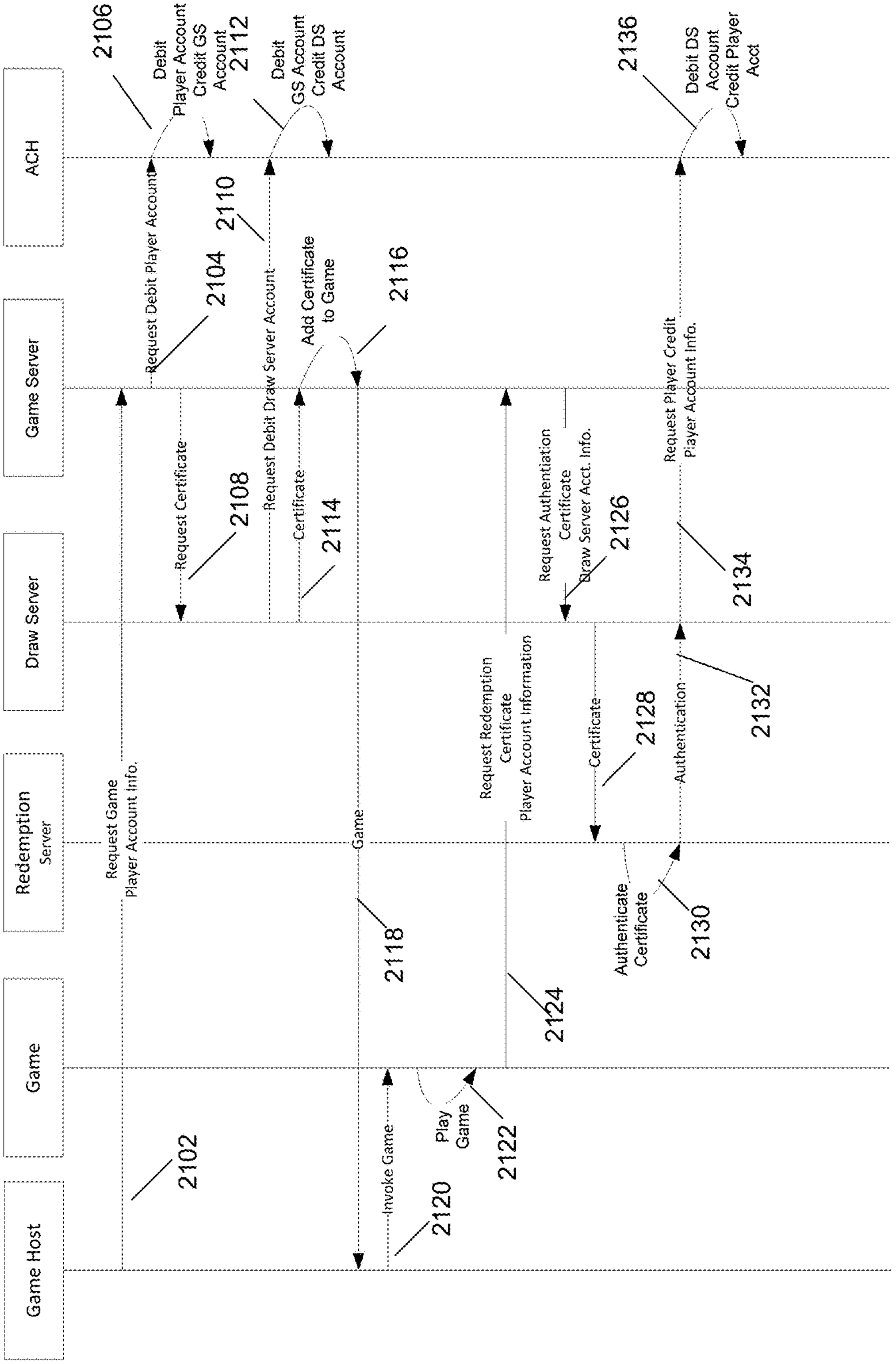
FIG. 21 illustrates a timing diagram of a process for managing and authenticating a player account during redemption of a draw certificate in accordance with an embodiment of the invention.

In accordance with some embodiments of this invention, a game server uses an ACH to perform credit transactions with game players. A timing diagram illustrating a sequence of operations for an exemplary gaming system using an ACH server in accordance with embodiments of this invention is shown in FIG. 21. In accordance with these embodiments, a local device, such as a mobile device, is providing the draw certificate based hybrid game to the user requests a game from a game server (2102). The request includes player account information that the game server will use to debit an account of a player requesting the game. The game server sends a request to an ACH to debit the player's account and credit an account associated with the operator of the game server (2104). The ACH performs the requested transactions debiting the player's account and crediting the account associated with the operator (2106). The game server sends a request for a draw certificate to a draw server (2108). The request includes game server account information that the draw server will use to debit an account associated with the game server operator and credit an account of the draw server. The draw server generates a draw certificate and transmits the draw certificate to the game server (2114). The draw server also sends a request to debit the game server account to an ACH server (2110). The ACH receives the request and debits the game server's account and credits the draw server's account (2112). The game server associates the draw certificate to a game (2116) and transmits the game to the local device (2118). The local device invokes the game (2120) so that the player may play the game (2122).

The draw certificate based hybrid game requests redemption of the draw certificate from the game server (2124). The request for redemption includes player account information that will be used to credit an account of the player. The game server receives the request and forwards the request, the draw certificate and the player account information to the draw server (2126). The draw server then transmits the draw certificate to the redemption server (2128). The redemption server authenticates the draw certificate (2130), and if the draw certificate is authentic, transmits an authentication confirmation to the draw server (2132). Based on the authentication, the draw server transmits a request to the ACH server that requests that the player's account be credited for the value of the draw certificate (2134). The ACH server credits the player's account (2136).

In this way, the operator of a game server can provide a draw certificate based hybrid game having a draw certificate without having to be responsible for management of the draw certificate. In accordance with some of these embodiments, the draw certificate is encrypted and an operator of the game server cannot inspect the draw certificate to determine its contents or value.

In accordance with further embodiments, it should be understood that playing of the draw certificate based hybrid game and redemption of the draw certificate can occur at separate times.

Figure 22:
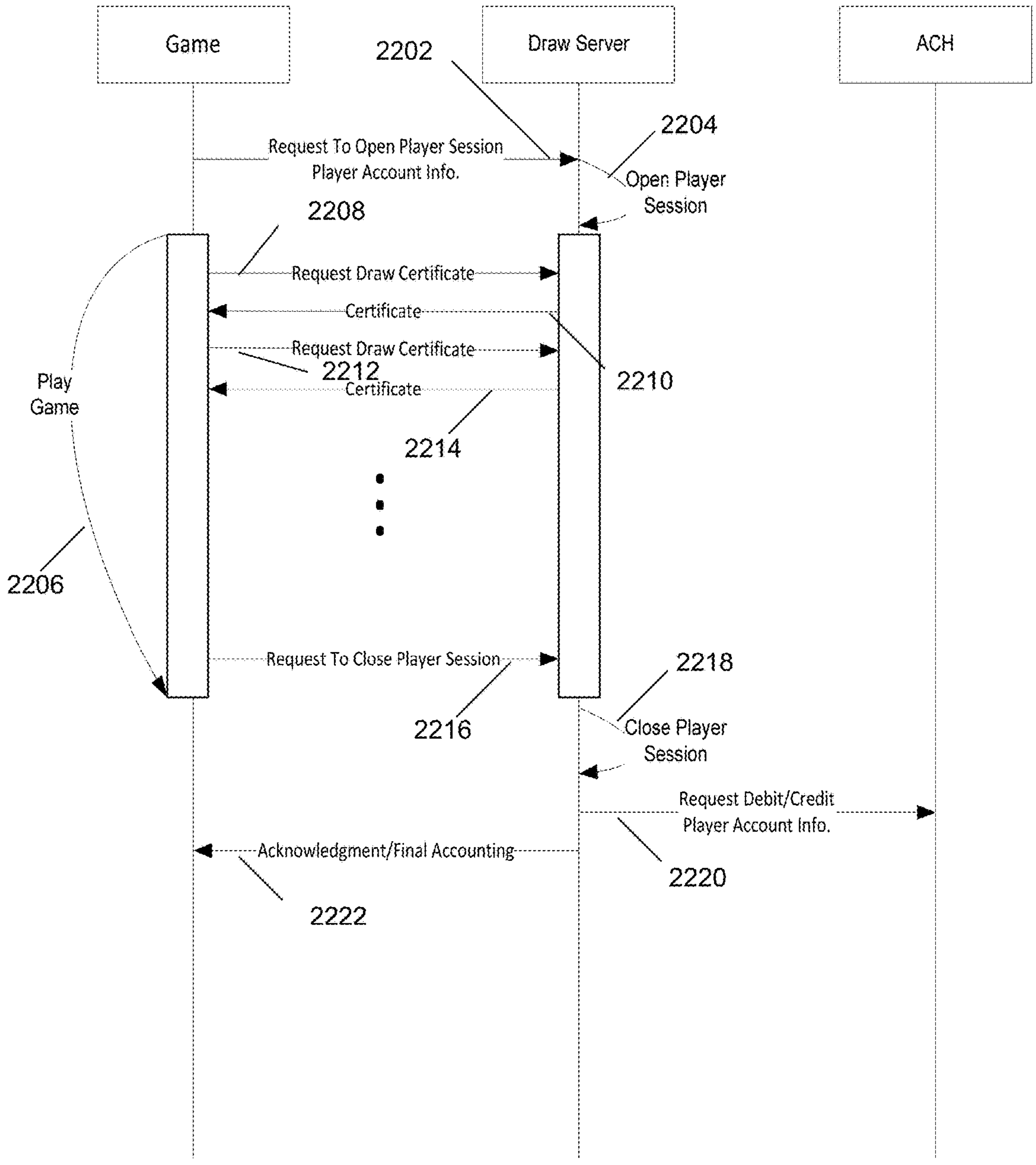
FIG. 22 illustrates a timing diagram of a process for issuing multiple draw certificates during game play in accordance with an embodiment of the invention.

A timing diagram illustrating a sequence of operations for an exemplary draw certificate based gambling hybrid gaming system using an ACH server in accordance with other embodiments of this invention is shown in FIG. 22. In accordance with these, a draw certificate based hybrid game transmits a request to open a player session to a draw server (2202). The request includes player account information. In response to the request for opening the player session, the draw server opens a session for the player (2204). While the player session is open, the draw certificate based hybrid game is played (2206) during which time the game requests (2208, 2212) and receives one or more draw certificates from the draw server. In response, the draw server transmits draw certificates to the draw certificate based hybrid game (2210, 2214). When the player is finished playing the draw certificate based hybrid game, the game sends a request to close the player session to the draw server (2216). The draw server then closes the player session (2218). The draw server also accounts for all of the draw certificates that were served to the game by the draw server. If there is a net win for the player, the draw server then requests that an ACH server credit the player's account from the draw server's account (2220). If there is a net loss, the draw server requests that the ACH server debit the player's account and credit the draw server's account (2220). The ACH server updates the player's account according to the request received from the draw server. The draw server also sends a final accounting to the draw certificate based hybrid game (2222).

Figure 23:
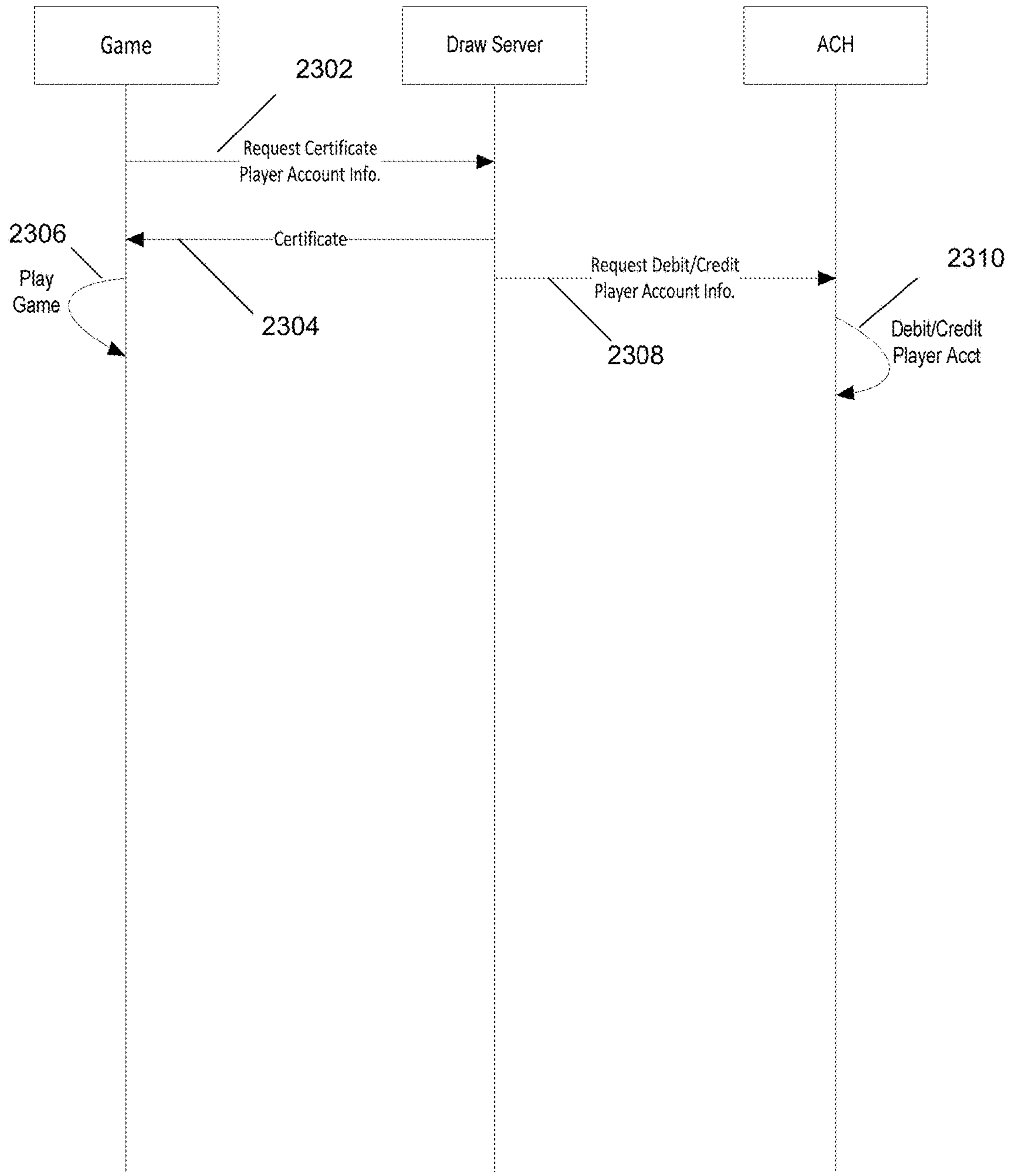
FIG. 23 illustrates a timing diagram of a process for issuing a draw certificate and transferring credits to or from a player's account based on the draw certificate in accordance with an embodiment of the invention.

A timing diagram illustrating a sequence of operations for an exemplary draw certificate based gambling hybrid gaming system using an ACH server in accordance with still other embodiments of this invention is shown in FIG. 23. A draw certificate based hybrid game transmits a request for a draw certificate to a draw server (2302). The request includes player account information that the draw server will use to debit and/or credit a player of the game for the draw certificates that are served to the game. The draw server receives the request and determines a draw certificate by any of the processes described herein. The draw server transmits the certificate to the draw certificate based hybrid game (2304) and the game uses the draw certificate during the playing of the game by the player (2306). In addition, the draw server uses the draw certificate to determine whether the draw certificate represented a net win or loss to the player. The draw server uses the win/loss information along with the player account information to request a debit and/or credit be applied to the player's account by an ACH server (2308). The ACH then updates the player's account accordingly.

Figure 24:
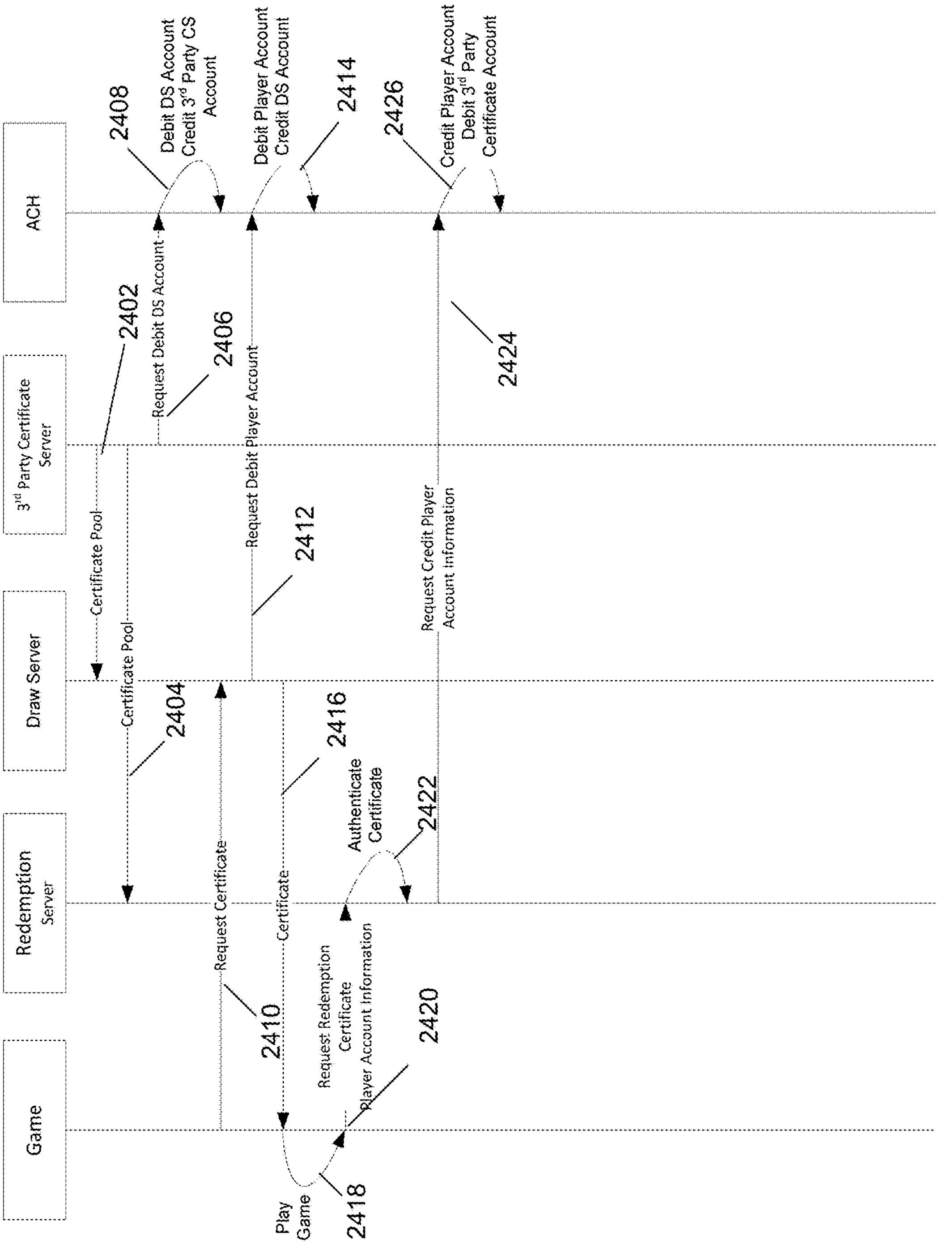
FIG. 24 illustrates a timing diagram of a process for redeeming draw certificates issued by a third party certificate provider in accordance with an embodiment of the invention.

In accordance with some embodiments of this invention, the draw certificates and wagers resolved by the draw certificates are provided by a third party certificate operator via a third party certificate server. Typically, an ACH server is used to handle the transfers of credits between the third party operator and the player. A diagram for a procedure implemented by an exemplary gaming system to transfer credits between player accounts and the third party operator account in accordance with embodiments of this invention is shown in FIG. 24. In accordance with these embodiments, a third party certificate server serves a certificate pool to a draw server (2402) and a redemption server (2404). When doing so, the 3rd party certificate server transmits a request to a debit of an account associated with the draw server and related credit of an account associated with the third party certificate server to an ACH server (2406). The ACH server updates the accounts accordingly (2408).

A draw certificate based hybrid game requests a draw certificate from the draw server (2410). The request for a draw certificate includes player account information. The draw server transmits to the draw certificate based hybrid game a draw certificate taken from the pool of draw certificates provided by the third party certificate server to the game (2416). In addition, the draw server transmits a request to a debit of an account associated with the player using the player account information and crediting of an account associated with the draw server to the ACH server (2412). The ACH server updates the accounts accordingly (2414). The draw certificate based hybrid game allows the player to play the game, using the draw certificate to determine a wagering outcome as described herein (2418). The draw certificate based hybrid game sends a request to the redemption server for redemption of the draw certificate (2420). The request includes player account information that the redemption server will use to credit an account associated with player if the draw certificate indicates that there was a net win in the wagering result. The redemption server authenticates the draw certificate (2422) and, if there is a net win for the player, sends a request to debit an account associated with the third party certificate server and credit the account associated with the player to the ACH server (2424). The ACH server then updates the accounts accordingly (2426).

Figure 25:
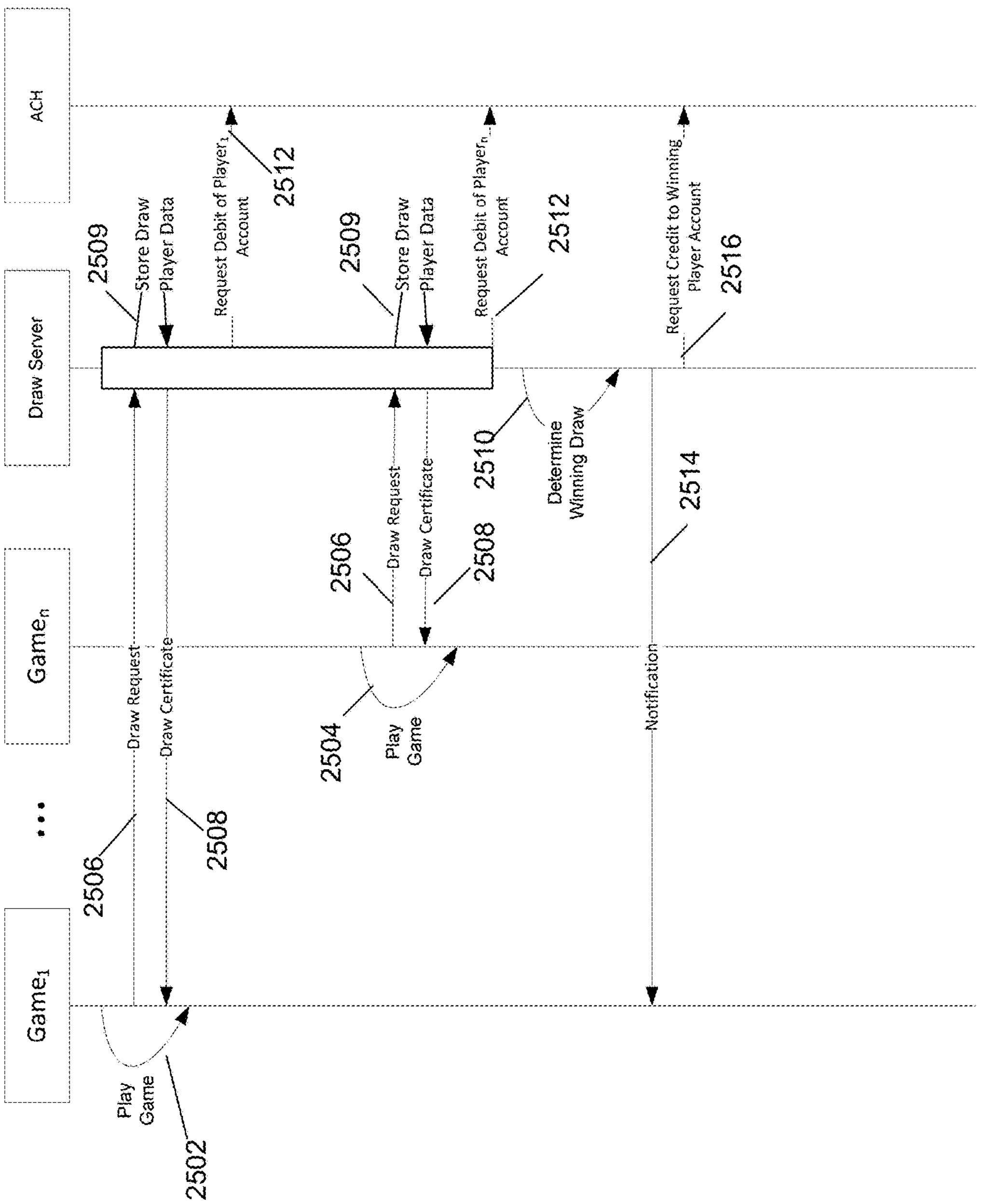
FIG. 25 illustrates a timing diagram of a process for providing draw certificates to multiple games and crediting a player with a winning wager in a lottery style game based on the draw certificates in accordance an embodiment of this of the invention.

In accordance with some embodiments of the invention, the game system may provide a lottery style centrally determined game. A timing diagram for providing a lottery style centrally determined game in accordance with embodiments of this invention is shown in FIG. 25. Multiple computing devices host a respective n number of draw certificate based hybrid games. The draw certificate based hybrid game may be the same for each computing device or may be different. The draw certificate based hybrid game may be hosted contemporaneously or may be hosted at different times. As each draw certificate based hybrid game is played (2502, 2504), the draw certificate based hybrid game sends a request to a draw server for a draw certificate (2506). Each request includes player information that will be used to associate a particular draw certificate with a player and also to debit an account associated with the player. In response to the request, the draw server generates a draw certificate having a unique identifier for the draw certificate. The draw certificate is then transmitted to the game (2508) and the draw server sends a request to debit an account associated with the player as identified by the player information and credit an account associated with the draw server to an ACH server (2512). The draw certificate is then stored or registered by the draw server into a draw pool (2509). During a specified period of time, the draw server receives requests for draw certificates and places the respectively generated draw certificates into a single pool. At the end of the specified period of time, the draw server randomly selects one or more of the draw certificates from the pool so as to indicate a winner of the lottery (2510). The draw server then uses the player information associated with each winning draw certificate to request that the ACH server credit of an account associated with the player (2516). The ACH server credits the players account. The draw server also uses the player information associated with a winning draw certificate to notify each draw certificate based hybrid game that the respective player has been credited for the win (2514).

Figure 26:
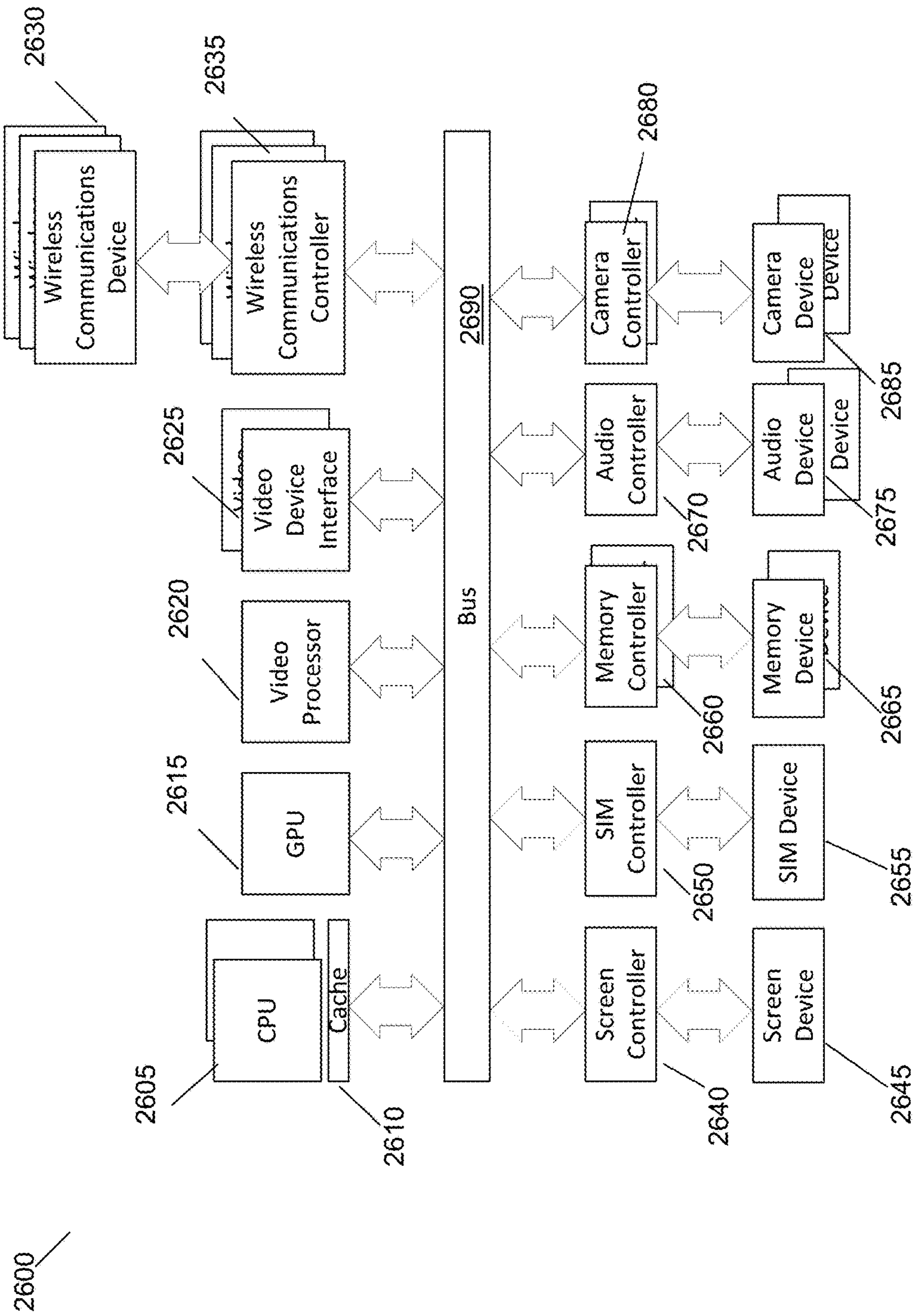
FIG. 26 illustrates a block diagram of components of a mobile device providing a draw certificate based hybrid game in accordance with an embodiment of the invention.

In accordance with some of the embodiments of this invention, the draw certificate based hybrid game is provided by a mobile computer device. An architecture diagram of a mobile computing device that provides a game in accordance with embodiments of this invention is shown in FIG. 26. The mobile computing device 2600 includes a CPU 2605 having a memory 2610 for storing processing instructions. The CPU 2605 is also operatively connected to a non-transitory processor-readable storage media, such as a storage device that stores processor-executable instructions and data. The CPU 2605 is also coupled to one or more interfaces that may be used to connect the CPU 2605 to other processing apparatuses as well as networks as previously described herein. The CPU 2605 is also coupled via the bus 2690 to user input devices, such as tactile devices including (but not limited to) keyboards, keypads, foot pads, touch screens, trackballs, as well as non-contact devices such as (but not limited to) audio input devices, motion sensors and motion capture devices, that the processing apparatus may use to receive inputs from a user when the user interacts with the processing apparatus. The CPU 2605 is also coupled via the bus 2605 to user output devices such as visual output devices including (but not limited to) display screens, light panels, lighted displays, audio output devices such as (but not limited to) speakers, sound amplifiers and tactile output devices including (but not limited to) vibrators, and manipulators that the CPU 2605 uses to generate outputs perceivable by the user when the user interacts with the mobile computing device.

In the shown embodiment, CPU 2605 is connected via bus 2690 to devices that displays including, but not limited to, Graphics Processing Unit 2615, video processor 2620, and video device interface 2625 to provide displays during game play. Audio presentations are provided by audio controller 2670 and audio devices 2675 that are connected to CPU 2605 via bus 3690. A user may input information via screen device 2645 that is connected to CPU 2605 via screen controller 2640 and bus 2690. Visual inputs may be captured by camera devices 2685 connected to CPU 2605 via camera controller 2680 and bus 2690. Memory storing data needed to provide the games may be provided by SIM device 2655 that is connected to CPU 2605 via SIM controller 2650 and Bus 2690; and Memory devices 2665 that are connected to CPU 2605 via memory controller 2660 and bus 2690. The device 2600 may connect to other input devices and to a network using network communication devices 2630. Network communication devices 2630 are connected to CPU 2605 via wireless communications controllers 2635 and bus 2690.

Although certain specific features and aspects of gaming system have been described herein, many additional modifications and variations would be apparent to those skilled in the art. For example, the features and aspects described herein may be implemented independently, cooperatively or alternatively without deviating from the spirit of the disclosure. It is therefore to be understood that gaming system may be practiced otherwise than as specifically described. For example, the various functions of the several servers that have been described herein may be combined in different ways such that one or more servers may be used to implement the various functions. As another example, while each server has been described as having a separate host, it is to be understood that the one or more servers may be hosted by one or more hosts. Thus, the foregoing description of a gaming system should be considered in all respects as illustrative and not restrictive.

What is claimed is:

1. A draw certificate hybrid game system, comprising:

a computing device constructed to:

request a first encrypted draw certificate from a draw server via a network, the first encrypted draw certificate representing a first wager outcome;

generate a user interface for an entertainment game of skill;

present the entertainment game of skill to a player, wherein the entertainment game has wagering events initiated by the player;

determine a first wagering event has been initiated by the player in the entertainment game;

request from the draw server a first authentication result, wherein the request for the first authentication result includes a first encrypted draw certificate;

determine a first wager result from the first authentication result;

update the user interface to display the first wager result within the entertainment game;

determine a change the entertainment game based on the first wager result;

modify the entertainment game based on the first wager result;

request a second encrypted draw certificate from the draw server via the network, the second encrypted draw certificate representing a second wager outcome;

determine a second wagering event has been initiated by the player in the entertainment game;

request from the draw server a second authentication result, wherein the request for the second authentication result includes a second encrypted draw certificate; and determine a second wager result from the second authentication result; and the draw server connected to the computing device via the network and connected to a certificate server, wherein the draw server is constructed to:

request from the certificate server a plurality of encrypted draw pools of certificates;

store the plurality of encrypted draw pools of certificates;

receive from the computed device the request for the first encrypted draw certificate;

generate the first encrypted draw certificate from a first pool of the plurality of encrypted draw pools of certificates;

communicate the first encrypted draw certificate to the computing device;

receive the request for the first authentication result;

decrypt the first encrypted draw certificate; and determine the first authentication result using the decrypted first draw certificate;

communicate the first authentication result to the computing device;

receive from the computed device the request for the second encrypted draw certificate;

generate the second encrypted draw certificate from a second pool of the plurality of encrypted draw pools of certificates;

communicate the second encrypted draw certificate to the computing device;

receive the request for the second authentication result;

decrypt the second encrypted draw certificate; and determine the second authentication result using the decrypted second draw certificate; and communicate the second authentication result to the computing device.

2. The draw certificate hybrid game system of claim 1 wherein the first request for the first encrypted draw certificate by the computing device includes identification information and receives the first encrypted draw certificate in response to the draw server authenticating the user with a player authentication server.

3. The draw certificate hybrid game system of claim 2 wherein the computing device construction to present the entertainment game is further constructed to:

determine an adjustment of game world credits of the player based on the first wager result; and update the game world credits of the player with the player authentication server in response to the determined adjustment.

4. The draw certificate hybrid game system of claim 1 wherein the computing device is further constructed to resolve the wager by:

requesting redemption of the first encrypted draw certificate from a redemption server that has received a copy of the first encrypted draw certificate wherein the request includes account information; and receiving acknowledgement of the first encrypted draw certificate that is redeemed in response to the redemption server settling the account with an authorized clearing house.

5. The draw certificate hybrid game system of claim 1 wherein the computing device is further constructed to:

receive a plurality of player actions;

determine requests for a plurality of wagers and a request to end a player session from the player actions;

request a plurality of encrypted draw certificates from the draw server wherein each encrypted draw certificate determines one of the plurality of wagers;

receive the plurality of encrypted draw certificates from the draw server;

determine the result of each of the plurality of wagers;

transmit a request to the draw server to close the player session; and receive an acknowledgement from the draw server that the session has ended and each of the plurality of encrypted draw certificates has been resolved by the draw server determining the outcome of each wager from the plurality encrypted of draw certificates and requesting that an automated account clearing house update a player account in accordance with the outcome of the wagers.

* * * * *